United States Patent
Huber et al.

(10) Patent No.: US 9,253,510 B2
(45) Date of Patent: Feb. 2, 2016

(54) METHODS, A CLIENT AND A SERVER FOR HANDLING AN MPEG TRANSPORT STREAM

(75) Inventors: Michael Huber, Sundbyberg (SE); Hans Byström, Sundbyberg (SE); Mats Cedervall, Härnösand (SE); Johan Kwarnmark, Hässelby (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 109 days.

(21) Appl. No.: 13/993,687

(22) PCT Filed: Dec. 15, 2010

(86) PCT No.: PCT/SE2010/051390
§ 371 (c)(1), (2), (4) Date: Jun. 13, 2013

(87) PCT Pub. No.: WO2012/082033
PCT Pub. Date: Jun. 21, 2012

(65) Prior Publication Data
US 2014/0201795 A1   Jul. 17, 2014

(51) Int. Cl.
*H04N 21/4782*   (2011.01)
*H04N 21/234*    (2011.01)
(Continued)

(52) U.S. Cl.
CPC ...... *H04N 21/23418* (2013.01); *H04L 65/4076* (2013.01); *H04L 65/4084* (2013.01); *H04L 65/607* (2013.01); *H04L 65/608* (2013.01); *H04L 65/80* (2013.01);
(Continued)

(58) Field of Classification Search
CPC .................................................. H04N 21/4622
See application file for complete search history.

(56) References Cited

U.S. PATENT DOCUMENTS

2008/0301745 A1*  12/2008  Liu .................... H04N 21/2221
                                                         725/110
2009/0028142 A1    1/2009  Schmidt et al.
(Continued)

FOREIGN PATENT DOCUMENTS

EP   2071850 A1   6/2009
EP   2197153 A1   6/2010

OTHER PUBLICATIONS

Wu, Dapeng et al., "On End-to-End Architecture for Transporting MPEG-4 Video Over the Internet", IEEE Transactions on Circuits and Systems for Video Technology, vol. 10, No. 6, Sep. 2000, pp. 923-941.

*Primary Examiner* — Jeffery Harold
*Assistant Examiner* — Sihar Karwan
(74) *Attorney, Agent, or Firm* — Patent Portfolio Builders, PLLC

(57) ABSTRACT

A method for re-transmitting missing packets in an improved manner in association with transmitting an MPEG transport stream between a client and a server of a communication network is provided. New type of customized control packets are introduced which are periodically embedded into the transport stream at the server from which the MPEG transport stream is distributed, wherein each of the embedded control packets is provided with package identification data. A client receiving the MPEG transport stream, including the embedded customized control packets, will, on the basis of the package identification data obtained from a customized control packet be able to identify each of n packets which were inserted by the server into the transport stream subsequent to the respective customized control packet.

32 Claims, 15 Drawing Sheets

(51) Int. Cl.
  *H04L 29/06* (2006.01)
  *H04N 21/236* (2011.01)
  *H04N 21/434* (2011.01)
  *H04N 21/6375* (2011.01)
  *H04N 21/643* (2011.01)
  *H04N 21/438* (2011.01)
  *H04N 21/44* (2011.01)

(52) U.S. Cl.
  CPC .. *H04N 21/23605* (2013.01); *H04N 21/23617* (2013.01); *H04N 21/4343* (2013.01); *H04N 21/4349* (2013.01); *H04N 21/4384* (2013.01); *H04N 21/44004* (2013.01); *H04N 21/6375* (2013.01); *H04N 21/64322* (2013.01)

(56) References Cited

U.S. PATENT DOCUMENTS

2009/0119722 A1 5/2009 VerSteeg et al.
2010/0238792 A1 9/2010 Togo

* cited by examiner

| Byte | Name |
|---|---|
| 0 | Version |
| 1 | Type |
| 2-3 | Repeat rate |
| 4-20 | Server address |
| 21-25 | Time Stamp |
| 26 | Length control data |
| 27 | Most previous RAP |
| 28 | Next RAP |
| 29 | Counter |
| 30-184 | Ret control data associated with upto n packets |

Fig. 4

| Array index | Packet identity |
|---|---|
| ⋮ | ⋮ |
| j | 127541 |
| J+1 | 533207 |
| J+2 | 328460 |
| J+3 | 597443 |

328460

Search pointer → J+2

List pointer → J+3

Fig. 7c

METHODS, A CLIENT AND A SERVER FOR HANDLING AN MPEG TRANSPORT STREAM

TECHNICAL FIELD

The present document refers to methods a client and a server for handling an MPEG (Moving Picture Experts Group) transport stream transmitted between a server and a client in an efficient way.

BACKGROUND

Internet Protocol Television (IPTV) is an emerging technique for delivering broadcasted TV services over an IP network, which is typically configured as a broadband access network. Currently the predominant IPTV service is Broadcast TV, where normal non-IPTV channels, as well as additional channels with low penetration can be transmitted over a broadband network from a super head-end to the end-user's STB (set top box).

MPEG (Moving Picture Experts Group) transport streams are commonly used for the purpose of transporting video, audio and text packets in IPTV networks, as well as in terrestrial, satellite and cable TV networks.

An MPEG stream is typically containing several elements, which are all needed for providing an ultimate user experience. If one UDP (User Datagram Protocol) packet is dropped, several of these smaller packets are lost, which may result in that the user experience is affected in a negative way. One way of solving this problem is to keep track of all sent packets on both the server and the client side. If a packet is lost, the client will request a re-transmission of the lost packet.

Several solutions for handling re-transmissions have been suggested, all having in common that the network packets have to be modified by adding an additional RTP (Real-Time Transport Protocol) header. The added RTP header does, however create problems for all STB's that does not support any RET (Re-transmission) mechanism. In order to overcome this problem, a client has to be modified such that the added RTP header can be understood by the client, even if the re-transmission feature is not even supported by the client.

SUMMARY

An object of this document is to address at least some of the problems mentioned above. More specifically, an object of this document is to provide a method for handling re-transmissions between a client and a server in a more efficient way, and to provide a respective client and a server which are configured to execute the suggested method.

Another object with the present document is to provide a method which enables for a more efficient FCC to be executed, and a client and a server which can execute the suggested FCC.

According to a first aspect, a method of handling a MPEG transport stream at a server of a communication network is provided, where customized control packets are periodically embedded into the transport stream, wherein each of the embedded control packets is provided with package ID (identification) data arranged such that after transmission to a client it enables the client to identify each of n packets subsequently inserted into the transport stream and received by the client.

By embedding the customized control packets into a transport stream in a periodical manner, no extra RTP header will be required for the purpose of handling re-transmissions, and thus no modifications will be required for clients which do not support the suggested feature.

In addition, a lower overhead than what is required for current RTP related RET solutions will be required.

More specifically, the control packets may be provided by repeatedly executing a process for a sequence of n packets, where for each of the n packets, associated package identification data is generated. Such package identification data comprise an array index representative of the relative order of the packet in the transport stream and an associated identity which is representative of at least a part of the content of the respective packet. Each array index and its associated identity are sequentially arranged in a control data list, wherein the control data list is inserted into a control packet, and embedded into the transport stream.

The n packets, which are made identifiable on the basis of data contained in one control packet, may be selected as n consecutive packets of the MPEG transport stream.

Alternatively, the n packets may be selectively chosen from an MPEG transport stream containing mts packets by selecting each k:th mts packet from the MPEG transport stream, where k<n.

According to yet another alternative, the n packets may instead be selectively chosen from an MPEG transport stream containing UDP packets, which are used as a carrier for the mts packets, by selecting each k:th UDP packet from the MPEG transport stream, where k<n.

The two latter alternatives will result in a reduced overhead and will be suitable for a large range of different media types.

The package identification data is preferable inserted into the payload of the control packet.

Furthermore, additional data which is representative of the respective transport stream and/or the n subsequent packets of the transport stream may be inserted into the control packet. Such further information may comprise at least one of: the version of the package format applied by the transport stream; the package type applied by the transport stream; the server address; a time stamp indicating a time instance of embedding a respective control packet; a control data length indicating the length of the payload of a respective control packet; a counter for counting the number of missing packets; an indication of the number of packets contained in the transport stream since the most previous RAP (Random Access point), and an indication of the remaining number of packets until the occurrence of the next RAP in the transport stream. Such further control information may typically be inserted into a header, such as e.g. in the RET header, of the control packet.

According to another aspect a method of handling an MPEG transport stream provided from a server of the communication network at a client of a communication network is also provided. Customized control packets periodically embedded into the transport stream by the server are extractable at the client, thereby enabling for the client to identify, on the basis of package identification data of an extracted control packet, each of n packets transmitted from the server subsequent to the control packet and received by the client.

By applying the suggested method for embedding control packet data into the transport stream, such control packets will be transparent to any client which does not recognize the control packets, and, thus, no modifications will be required for these clients, while the method is easy to implement for clients which are adapted to execute the suggested method. Depending on the strategy applied by the server, either each subsequent and consecutive packet may be selected from the received transport stream, or each k:th mts or UDP packet may be selected from the MPEG transport stream. As already mentioned, the selected strategy will to a large extent depend on the acceptable overhead.

The control packet data of a received control packet is stored by the client, such that the control packet data may later be extracted.

Due to the possibility of identifying received packets, the suggested method provides for a more efficient re-transmission process in association with MPEG transport stream distribution.

According to yet another aspect, the suggested control packet structure may also be applied for obtaining FCC in a more efficient way than what is possible with alternative solutions.

Such a method is initiated when a join channel request, requesting for a new transport stream, is received by a client, followed by receiving packets of the new transport stream, and handling each packet according to any of the following steps:

Storing control packet data of the packet, in case the received packet is a control packet, and requesting, from the server, start packets of the new transport stream of the selected channel identifiable on the basis of additional data extracted from stored control packet data; acquiring any buffered content associated with the new transport stream, and providing the requested and buffered content to a processing unit connected to the client, in case a fast channel change mode is active at the client and in case the number of packets between the present packet and the next RAP is below a predefined threshold, or Buffering, the received packet, in case the received packet is not a control packet and no stored control packet is available, or Comparing the received packet to stored control packet data, in case the received packet is not a control packet and stored control packet data is available at the client.

The additional data may comprise one or both of: an indication of the number of packets contained in the transport stream since the most recent RAP, and an indication of the remaining number of packets until the occurrence of the next RAP in the transport stream, wherein this information is usable for determining whether to request the start packets or whether to continue to receive a new transport stream packet by packet.

In addition the control packet may comprise information indicative of the repeating rate applied by the server for embedding the control packets into the transport stream.

When a packet of the transport stream other than a control packet is received, this packet may be identified by repeatedly comparing content of the received packet to identities extracted from the control packet until a comparison results in a match between a compared packet content and identity.

When a packet has been identified it is inserted into a buffer, and re-transmission of one or more packets identified as missing in case at least one of the comparisons did not result in a match is executed. If however, a first comparison resulted in a match, the identified packet can instead be directly used at processing means connected to the client together with each previously identified and buffered earlier packet of the transport stream.

During execution of the comparisons a received packet is compared to an identity pointed at by a list pointer, and wherein the method comprises the step of controlling the list pointer, such that after a first comparison resulting in a match the list pointer is pointing at an identity corresponding to the first of the received unidentified packets of the transport stream.

In addition to use control packet data for providing more efficient re-transmission and/or FCC, control packet data may also be used for enabling an accurate estimation of the quality of the connection used for distribution of an MPEG transport stream between a server and a client.

Therefore, a method according to yet another aspect is provided where a first control packet is received from a server wherein first control packet data from this first control packet is stored at a client. For each received packet other than a control packet, a client counter is incremented, and, upon receiving a second control packet and storing second control packet data also of the second control packet, the client counter is compared to a counter contained in the first control packet data, which is indicating the number of packets contained into the transport stream by the server between the first and the second control packet. On the basis of the comparison a quality measure for the connection used for transmitting the transport stream between the server and the client can then be estimated.

Also when applied for the purpose of providing FCC functionality to a client, a significant advantage with the described solution is that the FCC enabling logic hidden inside the MPEG transport stream in the form of control packet data is totally transparent to clients which do not support FCC.

According to yet another aspect a server at a communication network suitable for handling an MPEG transport stream and for executing a method according to any of the embodiment mentioned above, i.e. to prepare control packet data and to insert such data into control packets is provided.

Such a server is provided with an inserting unit, configured to periodically embed control packets into the transport stream, wherein each of said control packets comprise package identification data, enabling identification of n subsequent packets of the transport stream at a client of the communication network, and a first communication unit configured to transmit the control packets and the n subsequent packets to a client of the communication network.

The inserting unit may be configured to provide for the embedding of a control packet into the transport stream by: generating, for each of the n subsequent packets, control package identification data comprising an array index representative of the relative order of the packet in the transport stream and an associated identity which is representative of at least a part of the content of the respective packet; arranging each array index and associated identity as a separate post in a control data list, and inserting the control data list into a respective control packet.

The inserting unit may further be configured to insert further information on the structure of the transport stream into the control packet, wherein such further information may be indicative of at least one of: the version of the package format applied by the transport stream; the package type applied by the transport stream; the server address; a time stamp indicating a time instance of embedding a respective control packet; a control data length indicating the length of the payload of a respective control packet; a counter indicating the number of packets inserted into the transport stream since the last control packet; an indication of the number of packets contained in the transport stream since the most recent RAP, and an indication of the remaining number of packets until the occurrence of the next RAP in the transport stream.

According to yet another aspect also client suitable for handling an MPEG transport stream provided from a server of the communication network is provided, where such a client comprises an extracting unit configured to extract from the transport stream control packets periodically embedded into the transport stream by the server and received by a first communication unit of the client and to store data of the control packet in a first buffering unit, thereby enabling for the client to identify, on the basis of package identification data comprised in said stored data, each of n packets received by the client subsequent to said associated control packet.

The client is typically also provided with a comparing unit configured to identify the received packet by sequentially comparing content of the received packet to the package identification data until a comparison results in a match between content of the received packet and an identity contained in the package identification data.

The comparing unit may be configured to compare the received packet to an identity pointed at by a list pointer, and to control such a list pointer, such that after a comparison resulting in a direct match the list pointer is pointing at an identity corresponding to the first of the received unidentified packets of the transport stream.

The extracting unit may be configured to extract and store package identification data contained in a control identity list of said control packet, said control packet comprising, for each of n subsequent packets, a post comprising a respective array index and an associated identity which is representative of content of the respective packet; to receive a packet of the transport stream other than a control packet, and to identify the received packet by sequentially comparing content of the received packet to the identities of the control identity list until recognizing a match in the comparison.

The client described above may be implemented into any type of user equipment which is capable of processing data provided in an MPEG transport stream, such as e.g. a set top box, a cellular telephone, a laptop, a television set, or any other type of user equipment which is capable of handling an MPEG transport stream.

If the client is configured to apply FCC it typically also comprises an FCC unit configured to, in response to recognizing a fast channel change request, requesting for a new transport stream, instructing a second communication unit to request start packets associated with the new transport stream from the server; to acquire identified, buffered packets associated with the new transport stream from the second buffering unit, and to provide the requested start packets, once received by the second communication unit, together with any buffered packets to processing functionality connected to the client output.

The FCC unit is configured to determine whether or not to request said start packets from the server on the basis of RAP related data acquired from control packets received by said client.

In addition, the client may also comprise a client counter configured such that it is incremented for each packet other than control packets received by the client between two consecutive control packets, wherein, in association with recognizing the second of the consecutive control packets, the comparing unit is configured to compare the client counter to a counter contained in the first of said consecutive control packets, and to estimate on the basis of said comparison a quality measure for the connection used for transmitting the transport stream between the server and the client.

Further details and examples relating to the embodiments described above will now be described in further detail below.

BRIEF DESCRIPTION OF THE DRAWINGS

The objects, advantages and effects, as well as features of the invention, will be more readily understood from the following detailed description of exemplary embodiments of the invention when read together with the accompanying drawings, in which:

FIG. 4 is a control data list, containing data according to the content of the control packet illustrated in FIG. 2.

FIGS. 7a-7c illustrates, in another series of events, how, during a process for identifying a packet of a MPEG transport stream, content of a buffered control data list may be interrogated.

DETAILED DESCRIPTION

Figure 1:
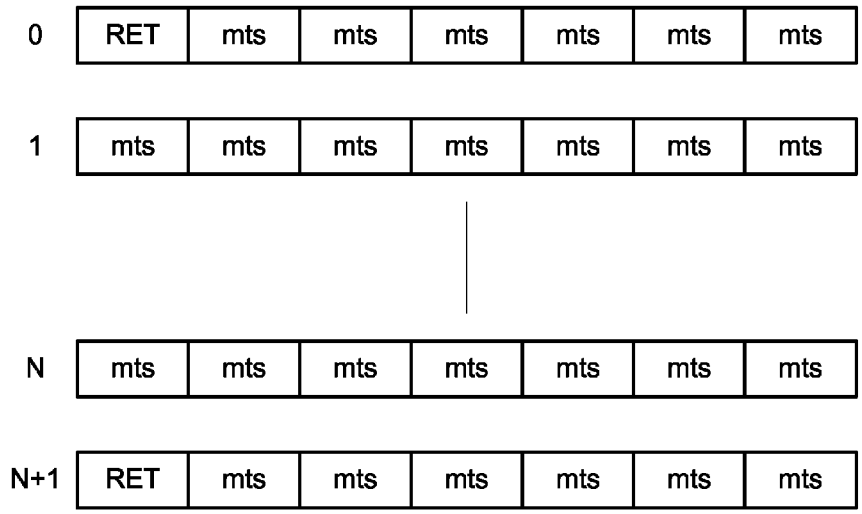
FIG. 1 is an illustration of an MPEG transport stream comprising embedded control packets, according to one exemplifying embodiment.

While the present document covers various alternative embodiments of the methods and arrangements as described below with reference to the disclosed figures, it is to be understood that the specific description and figures are not intended to limit the scope of the invention to the specific forms disclosed. On the contrary, the scope of the claimed invention is to be seen as including all modifications and alternative constructions thereof falling within the spirit and scope of the invention as expressed in the appended claims.

At least for the reasons set forth above a method is proposed where information which is descriptive of at least a part of an MPEG transport stream is inserted into the transport stream by a server. In addition, methods for extracting the inserted information from the transport stream once it has been provided to a client, thereby enabling for the client to use the extracted information during reception of the MPEG transport stream is also proposed.

More specifically, information on a certain amount of subsequently provided packets is contained in a new type of control packet, which can be referred to as customized control packets, since the control packets will be customized according to subsequent packets, wherein such a control packet is inserted into the transport stream on a periodic basis, thereby enabling for a client to extract the information on the subsequently provided packets on a frequent basis and thereby to use the information for keeping track of the content of the received transport stream. It is to be understood that throughout this document, the term control packet refers to the suggested customized control packet which will be further describe below, while the term "packet" refers to any type of packet contained in an MPEG transport stream other than the introduced customized control packet.

As will be described in further detail below, by providing the suggested information indicative of subsequent packets of an MPEG transport stream from a server to a client in the suggested way, the information may be used by a client configured to extract the information from the transport stream in a plurality of ways.

When using the suggested method during MPEG transport stream distribution, the RTP headers will no longer be needed for enabling re-transmissions between a server and a client.

In addition, by applying the suggested structure for the customized control packets, the information inserted into the control packets of the transport stream will be totally transparent for a client that have no support for the suggested information extracting feature, i.e. a client which is not configured to extract the suggested control packet from a transport stream will simply ignore the control packet and the rest of the transport stream will be handled by the client in a conventional way, without thereby causing any artifacts in any video or audio provided with the transport stream, while clients which have such a feature will have full support for making use of the extracted information.

According to a first embodiment, a client may use information obtained from the control packets mentioned above to provide a more efficient re-transmission process.

According to another embodiment, a client may use information obtained from the control packets for providing a more efficient faster channel switch procedure.

In addition, when applying any of the embodiments mentioned above, a client may also use additional information contained in the control packets for obtaining a more reliable quality measure indicative of the quality of a received transport stream.

FIG. 1 is an illustration of how an MPEG transport stream may look like after control packets have been periodically inserted into the transport stream. As indicated in FIG. 1, a control packet, here referred to as a Retransmission (RET) control packet, is inserted into the transport stream first in every N'th UDP packet, where each UDP packet, here indicated as 0, 1, n . . . n+1, comprises 7 packets, each of which is a MPEG transport stream (mts) packet or an inserted control packet.

Figure 2:
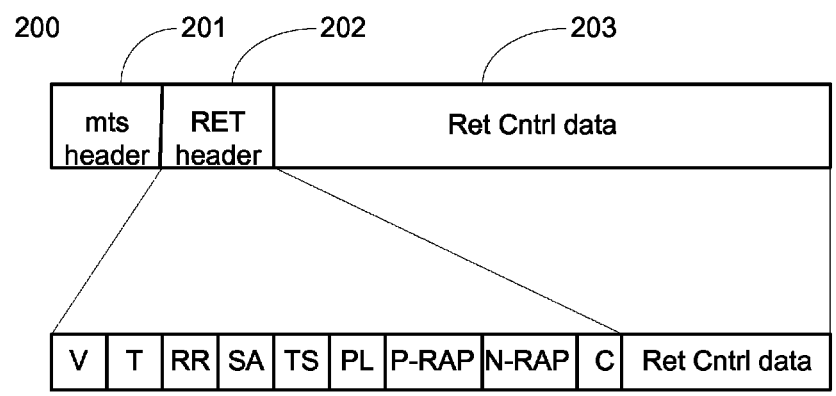
FIG. 2 is illustrating a configuration of a control packet, according to one embodiment.

It is to be understood that the control packet suggested in this document may be configured in a plurality of various ways and that such a control packet may contain different types of information. FIG. 2 is illustrating one example of how a control packet 200 may be arranged, where the control packet is divided into a mts header part 201, which comprises conventional mts information such as e.g. a synchronization byte (Sync byte), a packet identity (PID), a transport scrambling control and a continuity counter (CC); a RET header part 202, which comprises various data describing a part of the remaining transport stream, and a control data part 203, here referred to as RET ctrl data, which comprises control data elements, which can also be referred to as package identification data, configured to enable identification of a series of subsequent packets of the transport stream.

In the example of FIG. 2 the RET header comprises the following information on subsequent packets of a transport stream: the version (V) of the packet format used in the transport stream; the type of packets (T), such as e.g. UDP, mts or stepping, sent in the transport stream; the repeat rate (RR) applied for the insertion of control packets; the server address (SA) providing the address to the server from which the transport stream is accessible; a time stamp (TS) indicating for how long time the server is valid as a data source; length control data (PL) indicating the length of the payload; number of packets of the transport stream since the most previous RAP (P-RAP); number of packets of the transport stream until the next RAP (N-RAP); a counter (C), which is indicative of the number of packets of the transport stream transmitted from the server. The remaining bytes of the control packet according to the given example comprises package identification data, here referred to as RET cntrl data, comprising information for identifying a pre-defined number of subsequent packets, where for each of n identifiable packets, a package identity, package ID, is stored together with an associated array index, ranging between 1 and n.

As already indicated above, the content control packet may vary, depending on the requirements at a client receiving a respective transport stream, but in its simplest version, the control packet may comprise at least information on the applied repeating rate (RR), such that the client will be able to predict the frequency of receiving control packets.

Figure 3:
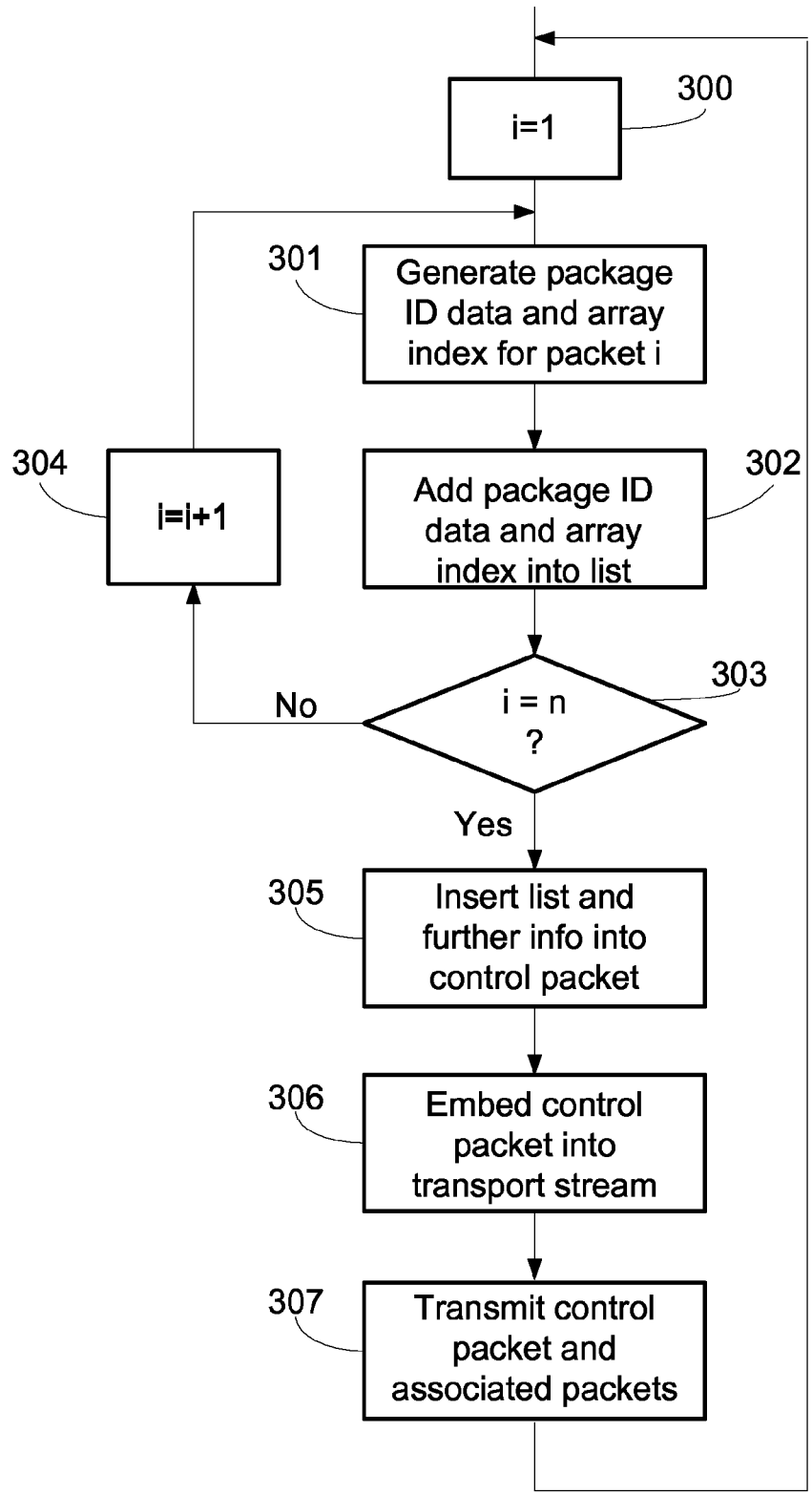
FIG. 3 is a flow chart illustrating a method to be performed at a server for embedding control packets into an MPEG transport stream, according to one embodiment.

A method for embedding control packets into an MPEG transport stream by a server, will now be described with reference to the flow chart of FIG. 3. In a first step 300 a cycle for generating a package ID (identity) and an associated index, here referred to as an array index i for n packets of an MPEG transport stream, is started by setting the array index i to 1, and in a next step 301, a package ID is generated for a first packet such that an identity becomes representative of at least a part of the content of the respective packet. A package ID may e.g. comprise 2 bytes from different unique parts of each packet which are often changed, such as e.g. byte 4 of an UDP packet payload that includes the CC counter that normally differs considerably from one packet to the other, and byte 32 which is in the middle of the UDP packet payload. In the UDP case, byte 220, which is in the middle of the second mts packet, can preferably be used.

There will typically be a tradeoff between the number of control packets used and the length of a package ID, where the overhead increases with the number of control packets, while packets will be easier to distinguish from each other with longer package IDs.

Alternatively, the package ID may be adaptively generated in such a way that for each identifiable packet it comprises a first part, which may be referred to as a check mask, indicating which parts of the respective packet which are to be considered during the identification procedure, and a second part, comprising the actual package identification data.

Each package ID and its associated array index are then inserted into a list, which may be referred to as a RET control data list, but which from hereinafter will be referred to as a control data list, as indicated in step 302. As indicated in FIG. 3, steps 301 and 302 are repeated until the control data list comprises posts with a respective package identity and associated array index for n packets of the MPEG transport stream. Once the control data list contains a package ID and associated array index for n packets, the list is inserted into a control packet, together with additional information on the n identifiable packets, as indicated in step 305. In a next step 306, the control packet is embedded into the MPEG transport stream after which the control packet and the following n packets are transmitted to a user device, such as e.g. a set top box, a cellular telephone, a laptop, a television set, or another rendering device which is capable of handling MPEG Transport streams, as indicated in the final step 307. Alternatively, the control packets and associated packets of the transport stream can be stored at a storage means for later transmittal to one or more user devices.

There are several ways to keep track of packets in the payload by applying the method described above, which may differ depending on the specific area where it should be used.

According to one embodiment, each mts packet may be considered and made identifiable or trackable. Such a strategy may however in many situations result in a relatively large overhead.

According to another embodiment, which is very suitable e.g. in an IPTV application, each UDP, typically comprising 7 mts packets, may instead be considered and made identifiable.

According to yet another embodiment, which saves even more overhead, the method may instead be arranged such that instead of considering n consecutive packets only a pre-defined multiple of packets, which can be expressed as every k:th packet, where <n, from the packets of a transport stream, which may be either mts or UDP packets, is considered and made identifiable, while the packets inserted in-between the identifiable packets are counted. Such a solution is suitable for media transport which is not based on IP media transport, such as e.g. DVB-S, DVB-T and DVB-C. The latter embodiment will correspond to the previous embodiment in case k=7 and every k:th mts packet is selected, i.e. every 7:th mts packet from a transport stream is selected and made identifiable.

One advantage with the suggested method is that it requires a limited overhead. To illustrate this, the differences in overhead required by a conventional RTP based solution and the solution suggested in this document will therefore be presented with the following example.

In a package structure such as the one described above with reference to FIG. 4, 154 bytes (byte 30-184) are used for identifying packets. If at least two bytes are used for identifying each UDP packet, the resulting overhead will be considerably lower than what is obtained by applying a conventional RTP solution as indicated with the examples below:

The overhead using a conventional RTP based solution, here referred to as overhead_1, can be calculated using the following formula:

$$\text{Overhead\_1} = \frac{\text{RTP\_header\_size}}{\text{nr\_of\_packets} * \text{mts\_size}} \quad (1)$$

where RTP_header_size indicated the number of bytes of the RTP header, nr_of_packets, indicates the number of mts packets in each UDP packet, and mts size indicates the length of an mts packet in bytes.

With an RTP header of 12 bytes, nr_of_mts_packets set to 7 and mts_byte_length set to 188, obverhead_1 expressed with formula (1) will be calculated as 12/(7*188), giving an overhead of 0.9119%

The overhead for the solution suggested in the present document, here referred to as overhead_2, can be calculated from the following formula:

$$\text{Overhead\_2} = \frac{\text{mts\_size}}{\left(\left(\left(\frac{\text{RET\_ctrl\_data}}{\text{ID\_byte\_length}}\right) * \text{nr\_of\_packets} * \text{mts\_size}\right) - \text{mts\_size}\right)} \quad (2)$$

where RET ctrl data is the number of bytes available for packet identification, ID byte length is the length in bytes allocated for package identification data associated with a respective packet, nr of mts packets that can be fit into a normal UDP packet.

Formula (2) may be simplified such that:

$$\text{Overhead\_2} = \frac{1}{\left(\left(\left(\frac{\text{RET\_ctrl\_data}}{\text{ID\_byte\_length}}\right) * \text{nr\_of\_packets}\right) - 1\right)} \quad (3)$$

With RET ctrl data set to 154, ave_nr_of_mts set to 7 and ID_byte length set to 3, i.e. three bytes are used for identifying a packet, Overhead_2 will be calculated as 1/(((154/3)*7−1, which gives an overhead of 0.2790%, while an ID_byte length selected to 2 bytes instead of 3 will give the even lower overhead of 0.1859%.

Obviously, both choices given above will give a considerable improvement compared to the overhead resulting from using the conventional RTP based solution.

A control data list, arranged to hold the data described in FIG. 2 above may be arranged as indicated in FIG. 4, where a control data list of 184 bytes is illustrated according to one embodiment. As already mentioned above, the data provided into the control data list may vary depending on application. By way of example, the counter may, e.g. use more than one byte, as suggested in the figure, if better accuracy in the statistics is required.

The described process is then repeated for another set of n packets until the complete transport stream has been processed accordingly.

By embedding the package ID's together with any additional data into a control packet, as suggested above, a client being able to identify and extract this packet may make use of the information for various purposes.

Figure 5A:
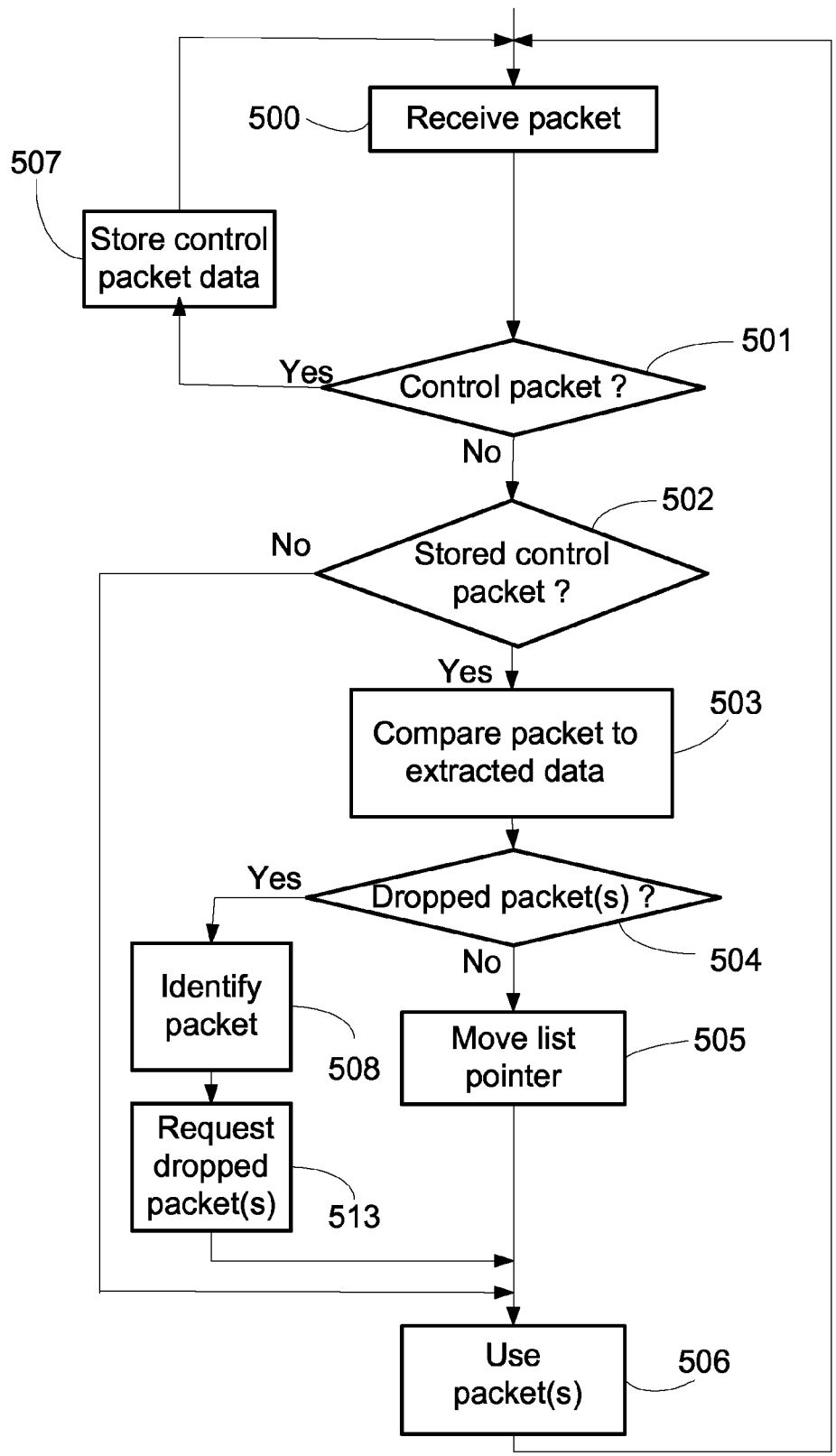
FIG. 5a is another flow chart illustrating a method to be performed by a client according to one embodiment for extracting and handling control packets of a received MPEG transport stream.

FIG. 5a is a flow chart illustrating a method to be performed by a client for extracting and handling control packets of an MPEG transport stream. The method of FIG. 5a describes, according to a first embodiment, how a client of a user device can use data acquired via a control packet provided from the transport stream to identify missing packets of a received MPEG transport stream such that re-transmission of the identified missing packets can be achieved in a more efficient way.

In a first step 500 of FIG. 5a, a packet of an MPEG media stream is received by the client, which is configured to recognize and extract customized control packets. In a next step 501, the client determines whether or not the received packet is a control packet. Assuming that the received packet is not a control packet, the client determined in a next step 502 whether there is any stored control packet data available at the client. In the present case we assume that no control packet data is available, and thus the received packet is forwarded to processing functionality operatively connected to the client. This is indicated with step 506 in FIG. 5a.

The described process is repeated until a control packet is recognized in step 501. Upon recognizing a control packet a re-transmission procedure which relies on the control packet data will start by first storing of buffering control packet data as described above, as indicated with step 507.

At the client, the control packet data, provided as a control data list is stored as a continuous, or a dynamic, list, typically in a ring buffer or a dynamic buffer, such that data from repeatedly received control packets in the form of new control data lists is accumulated in the buffer.

Following the reception of a control packet and the storing of the control packet data, the client will normally continue to receive packets other than control packets of an MPEG transport stream to which the data of the control packet is associated. More specifically, n identifiable packets will now be expected by the client.

In a repeated step 500, another packet is received. In the present case, unless the rare case would occur where all n packets of an MPEG transport stream following a control packet are lost, it is assumed that the received packet is identified as being a packet other than a control packet. Since there are now control packet data available at the client, step 502 is followed by initiation of a comparison of certain parts of the received packet to control packet data extracted from the stored control packet data, as indicated with step 503. As indicated in a step 504, it is determined whether the received packet is the expected packet, and thus, no packet has been dropped during reception of the transport stream, or if the received packet is not the expected packet, i.e. one or more packets have been dropped during the transmission. More specifically, the received packet is compared to the extracted package ID's of the stored control data list, starting at this stage with the first post in the list, i.e. with the post having array index 1. In case of no dropped packets, i.e. certain data of the received packet corresponds to the package ID of the compared post of the control data list, the packet is identified.

Each time a packet is identified, a pointer, from hereinafter referred to as list pointer, is moved to the next post of the control data list, such that it is pointing at the next array index, i.e. the array index associated with the next expected packet. This is indicated with a step 505. Thereby, each time a new packet is compared by the client the list pointer will point at the next expected, but yet unidentified, packet of the incoming MPEG transport stream.

In a subsequent step 506 the identified packet is provided by the client to appropriate functionality of a respective user device supported by the client, such as e.g. functionality for processing and rendering the content of the packet in a conventional manner.

Whenever a new control packet is identified in the incoming MPEG transport stream in step 501, data of this new control packet, i.e. a new control data list, is extracted from the transport stream, and added to the previous control data list and buffered as the accumulated control data list for later retrieval by the client, when step 507 is executed.

In case a comparison executed in step 503 results in no match, i.e. the received packet is not the expected packet due to that one or more previous packets have been lost during transmission, a procedure for identifying the packet will commence, as indicated with step 508. Such a procedure will be running until the compared packet match with a post in the buffered control data list, i.e. until the packet is identified. Once identified, the one or more packets which were found to be dropped as a result of the comparisons is/are requested from the server, as indicated with step 513, and once received the re-transmitted packets can be used, as indicated with step 506.

Figure 5B:
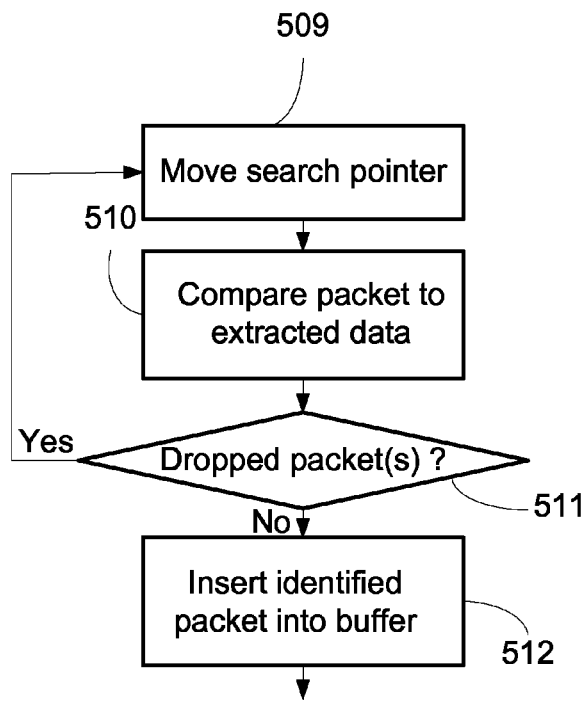
FIG. 5b is a flow chart illustrating a procedure for identifying a packet received by a client.

The identification process of step 508 will now be described in further detail with reference to FIG. 5b, where in a step 509 another pointer, from hereinafter referred to as a search pointer, is moved forward one step in relation to the list pointer in the control packet list, such that a new comparison can be executed by way of comparing the received packet to the first unidentified packet in the control packet list, as indicated with a step 510. This process is repeated for subsequent posts in the buffered control data list until a match occur in a comparison. This is indicated with conditional step 511. Once a match has occurred, the now identified packet is inserted into a buffer, as indicated in step 512.

Figure 5C:
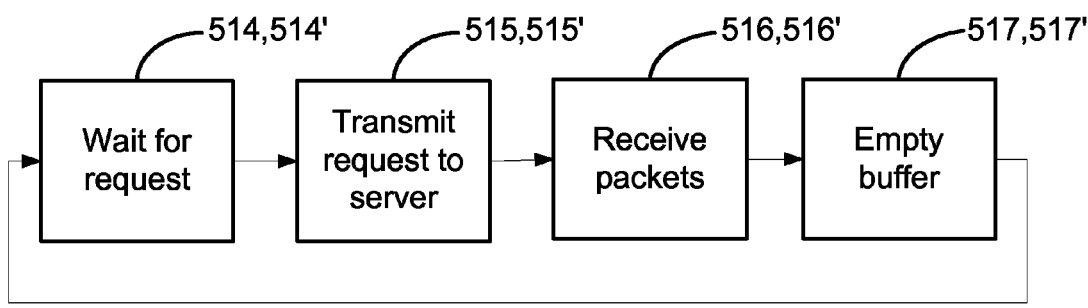
FIG. 5c is a flow chart illustrating a procedure for assuring that dropped packets are re-transmitted or requested start packets are provided from a server to a client.

With the received packet identified, each packet which was found to be dropped in the comparison process described above can now be requested from the server. Therefore, the process of step 513 will be described in further detail with reference to the flow chart of FIG. 5c. As indicated with step 514 of FIG. 5c, a process is described which is triggered once a packet is requested from the server by the client. In a next step 515 a request for a dropped packet is transmitted to the server, and in a subsequent step 516, the requested, re-transmitted packet is received by the client, thereby enabling for the client to forward the packet to processing functionality, as indicated with step 506. As indicated with a final step 517 of the loop of FIG. 5c, any buffered previously identified packets are also acquired by having the buffer emptied such that the buffered packets can be forwarded to the processing functionality together with the most recently identified packet. Simultaneously, the posts of the control packet data list which corresponds to the forwarded packets may be deleted from the list, such that the list will only contain yet unidentified packets. The loop of FIG. 5c is repeated for each requested re-transmission.

As already indicated above, the buffer containing previously identified packets is emptied in step 517, i.e. each time a packet has been identified, this packet is provided to processing functionality for usage, together with any previously identified and buffered packets. As a consequence, all packets transmitted prior to an identified packet, which have previously been received, identified and buffered by the client are also provided from the client to any type of processing functionality which may be connected to the output of the client.

The process described above is repeated until termination of reception of the transport stream.

Figure 6A:
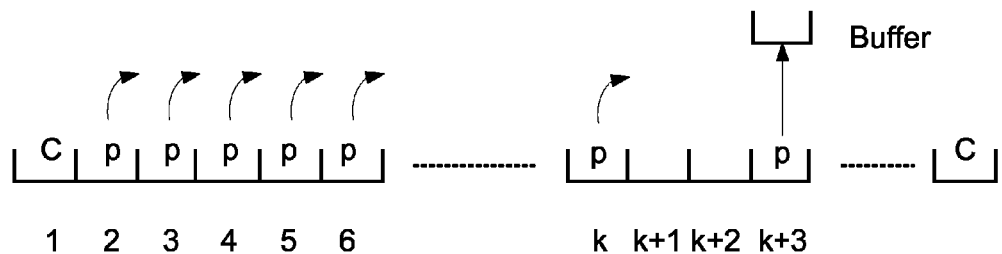
FIGS. 6a-6c is illustrating a series of events, where comparison between received packets and packets contained in a control data list is executed.
Figure 6B:
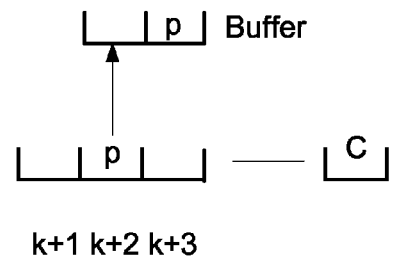
Figure 6C:
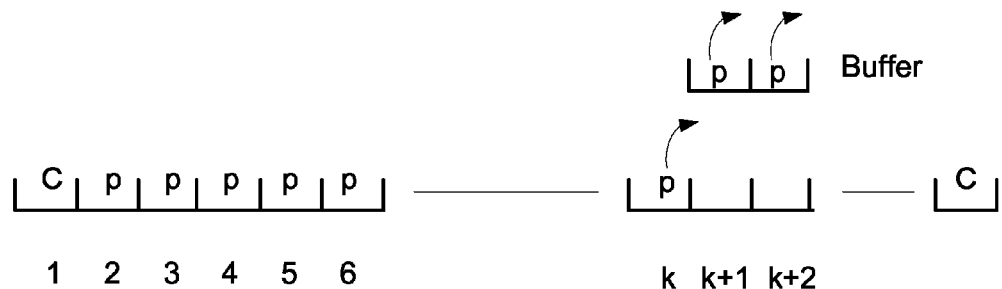

FIGS. 6a-6c illustrates, in a series of events, how a comparison between received packets and packets contained in a control data list may be executed, where, in FIG. 6a, subsequent to receiving a control packet, C, k packets, here indexed from 1 to k, are correctly received and provided to appropriate functionality for processing by a client. However, after comparing a subsequent packet, packet k+3 is identified as the next packet, i.e. the two packets, indexed k+1 and k+2 are missing. Consequently, packet k+3 is buffered and re-transmission of packets k+1 and k+2 is requested by the client.

As indicated in FIG. 6b, packet k+2 is then correctly identified and buffered, and as indicated in FIG. 6c, once packet k has also been received and identified by the client, packet k is forwarded by the client for processing, together with packets k+1 and k+2, which are obtained from the buffer, and which are now forming a sequence of identified packets.

Figure 7A:
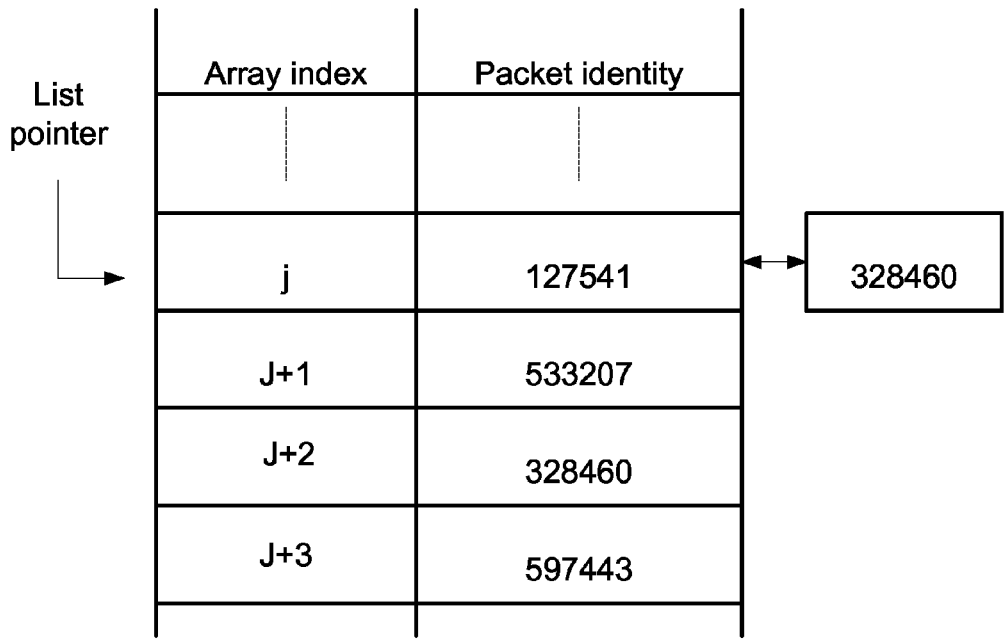
Figure 7B:
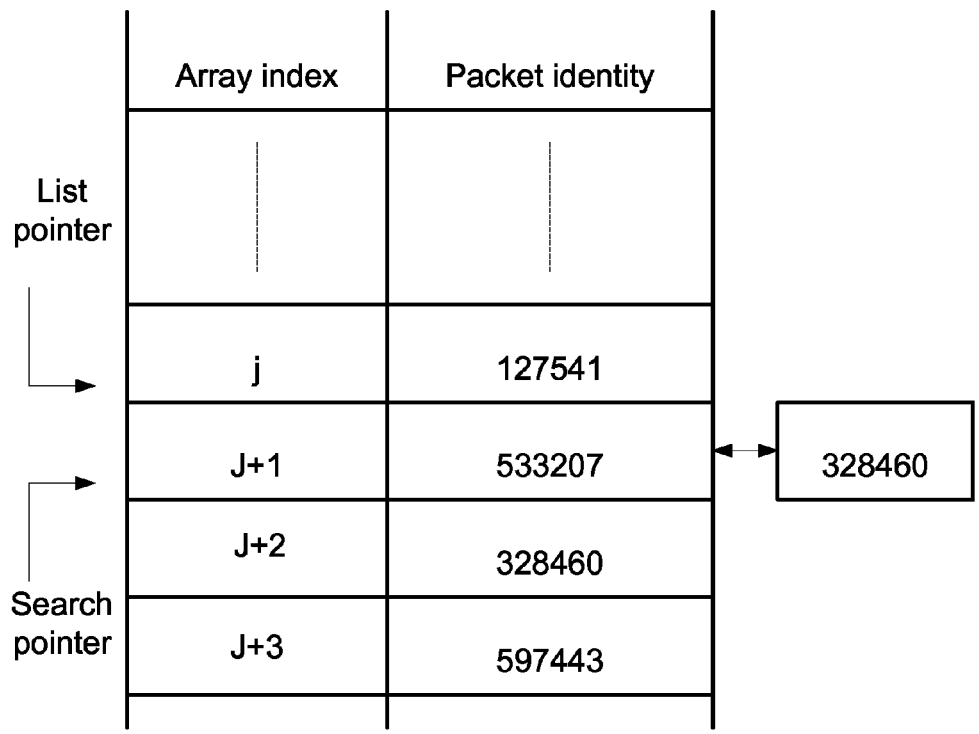

FIG. 7a-7c illustrates, in another series of events, how, during a process for identifying a packet of a MPEG transport stream, content of a buffered control data list may be interrogated. In FIG. 7a, we assume that packet j−1 and all earlier packets have been successfully received and identified, and, as a consequence, the list pointer points at array index j. According to the list pointer, the next packet containing identification data "328460" is compared to a post in a RET control data list having array index j, i.e. "127541", resulting in a no match.

As indicated in FIG. 7b, the search continues by a search pointer being set to point at the next post in the list, having array index j+1. Since the content of the packet and the compared post differs, also this comparison results in no match. The search pointer is therefore once again moved as indicated in FIG. 7c, where the comparison results in a match. Consequently, the packet is made available to processing means connected to the client and, since packet j+2 and all preceding packets have now been identified, the list pointer is moved to the post associated with the next not yet identified packet i.e. to the post having array index j+3.

A common problem related to IPTV is how to reduce the delay caused during switching between channels. When an IPTV user switches channel the STB sends an Internet Group management Protocol (IGMP) message to a server, instructing the server to leave the current channel and to join a new one. In IGMP these two steps are performed with one and the same message, while in previous versions of IGMP the leave and join are sent in two separate messages.

In order to minimize bandwidth requirements during the channel switch, the STB joins a multicast group containing multiplexed MPEG data frames. When the STB joins a new channel, certain control elements in the mts's of the transport stream need to be found and processed in order to be able to select video and audio flows. The time it takes to find these elements will effect the delay experienced by the user when switching channels. There are different frames in MPEG, such as I-frames which contain a full picture, P-frames containing incremental extrapolation information, and B-frames, containing interpolation information. Since B and P frames depend on adjacent frames it is necessary that the STB receives a full I-frame before a new channel can be shown. This means that the average time for switching between channels will depend on the time between I-frames and the location of the control elements in the mts stream structure. Typically for MPEG-2, the distance between two I-frames is around 0.5 seconds, while it can be several seconds for MPEG-4 part 10.

By applying the control packages suggested above the channel switching procedure of a STB may be improved. A client which has been implemented on a STB which is configured to recognize and process the suggested control packets will be able to apply an improved FCC (Fast Channel Change), providing back compatibility, such that no modifications need to be done to STB's comprising clients which do not support this feature. In order to be able to execute the method according to the present embodiment, the control packets will contain information on the next and last I-frame. An MPEG transport stream comprises Random Access Points (RAP), where a RAP comprise an I-frame together with information necessary for starting decoding of the respective packets making up the transport stream. In the present context information on the next RAP is stored as a parameter referred to as RAP-next while information on the next RAP to be expected is stored as a parameter referred to as and RAP-previous, as indicate in the example given above with reference to FIGS. 2 and 4.

By having such information contained in the control packets, a client of a STB can use the information acquired from a control packet to make a decision on how to acquire packets associated with a selected channel from a server in the most efficient way. More specifically, based on the data of a control packet, describing subsequent packets, the client will be able to decide to either acquire starting packets sent before the join request was received by the server, while the client continues to receive and buffer multicast data from the stream until all required packets are received or the buffer is full, or to receive the required packets as they arrive to the client. The latter case is relevant in case the client determines, on the basis of data of a control packet, that an I-frame will soon be received.

In particular the client may apply a Quality of Experience criterion which is specifying how long a channel join is allowed to take. The client is aware of how large buffer it needs, the inherent delays, as well as the delays until the next RAP will arrive in the transport stream, which is calculated from the next RAP header. By considering these time intervals the client will get a good estimation of the time a channel join will take. If this accumulated calculated time is larger than the one allowed by the Quality of Experience criteria the client may be preconfigured to perform the FCC procedure.

Figure 8:
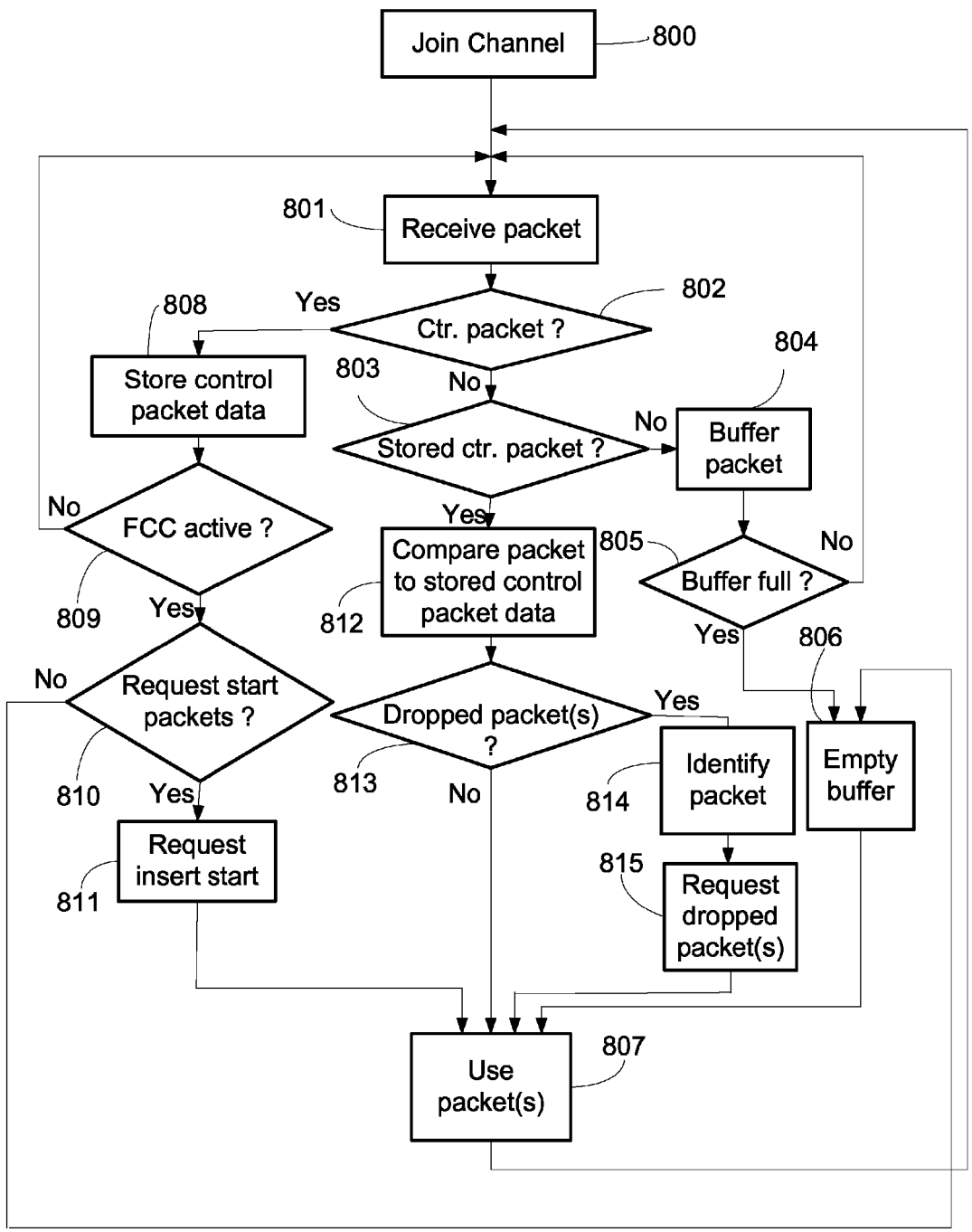
FIG. 8 is a simplified flow chart illustrating a method to be performed by a client according to yet another embodiment for extracting control packets from a received MPEG transport stream and for using content of extracted control packets for improving a channel change when applying fast channel change.

According to another embodiment, which will now be described in further detail with reference to FIG. 8, package identification data together with additional content of the described control packets can therefore be used for enabling a client of a STB to execute a FCC which minimizes the delay time caused by the channel switch.

In a first step 800, the client receives a join channel request via a user interface of the STB in a conventional manner, as a result from a user having decided to switch channel on the STB. Subsequent to receiving a join channel request it is determined in a step 802 whether or not a packet received from a server, as indicated in a previous step 801, is a control packet. If the received packet is not a control packet it is determined, in another step 803, if the client has access to stored control packet data, i.e. if a control packet has been stored after having received a join channel request.

Since in the present example the received packet is the first packet received since reception of the join channel request no control packet data has yet been stored, and thus no stored control packet will be available. With no control packet data available, no FCC decision can be taken yet and therefore the received packet is stored in a buffer, as indicated in step 804. A corresponding procedure will be repeated also for subsequently received packets, until it is determined in step 802 that a control packet has been received in the transport stream. If, however, during the described packet reception process the buffer becomes full, the buffer is emptied, as indicated in step 806, and the buffered packets are forwarded to the functionality of the STB for usage, i.e. for processing according to conventional procedures, as indicated in step 807.

When it is determined in step 802 that a control packet has been received, the content of that control packet is stored, as indicate in step 808. In a next step 809 it is determined whether or not FCC is activated at the STB, i.e. if the STB is in an FCC mode. If FCC is not activated, the described process is repeated for the next received packet by once again executing step 801 for a subsequently received packet. However, if FCC is activated the client extracts stored control packet data, and more specifically, additional data typically contained in the header of the control packet, to be used for making a decision as to how to acquire the packets associated with the selected channel in the most effective way. Execution of such a decision is indicated with step 810. In association with requesting start packets, the stored control packet data may typically be deleted, since only the content of the first control packet received from the transport stream subsequent to the join channel request is of interest for speeding op the FCC procedure. More specifically, by considering information on the previous and the next RAP, comprised in the additional control packet data, the client will be able to make a decision to either request downloading of a "missing start", which may also be referred to as "start packets" of the requested channels, i.e. packets which had been distributed by the server already before the STB joined the new channel, or if, according to the acquired information, it is more advantageous, from a delay point of view, to receive packet by packet until the next RAP arrives.

In the latter case the process is continued in a conventional way by receiving a next packet in step 801 which is processed as described above, while in the former case, the client requests for the start packets from the server, as indicated in step 811. Step 811 can be described as a separate FCC related process which corresponds to the process described above with reference to FIG. 5c. In this case, however, certain start packets are requested from the server instead of missing packets. Once received, the start packets are provided to the processing functionality of the STB. In addition to requesting the start packets, also the packets which have so far been buffered from when the join channel request was recognized until the decision to request the start packets, if any, are added to the acquired start packets so that these packets can be provided to the processing functionality for final processing. The buffered packets are acquired by emptying the buffer. More specifically, when run in the present embodiment the suggested FCC related process awaits a request for start packets in a first step referred to in FIG. 5c as 514'. Upon recognizing a request for start packets such a request is transmitted to the server in a next step referred to as step 515'. The start packets are received by the client in a step 516', and in a final step 517' the buffer is emptied from any packets which have so far been buffered in step 804 of FIG. 8, i.e. step 517' is actually triggering step 806 of FIG. 8.

More specifically, based on information on the number of packets to expect in the MPEG transport stream since the previous RAP, all packets of the selected MPEG transport stream counting from the previous RAP until the last packet before the control packet, can be requested from the server. By using the start packets and the packets already buffered in step 804, the client will be able to provide content of the requested channel to processing means of the STB, without having to await the next RAP in the MPEG transport stream. Obviously such a decision is advantageous when a long delay is to be expected, and thus in such a scenario the channel switch can be executed with less delay than what would be necessary otherwise.

If in step 810 it was instead determined not to request the start packets from the server, the client will empty the buffer, as indicated in step 806 and provide the packets for usage, as indicated in step 807, after which remaining packets are received.

If in step 802 it is determined that a received packet is not a control packet, it will be determined in step 803 whether there is control packet data stored which is valid for the present channel switch. In the present example control packet data was stored in step 808 and is actually now available at the client. As a consequence, a comparison between the received packet and associated package identification data is initiated, as indicated in another step 812, such a comparison results either in that the received packet is the expected packet, i.e. there is a match in the comparison, or that one or more packets have been dropped, i.e. one or more expected packets are missing, as indicated with step 813.

If the packet is directly identified, there are no dropped packets and the packets can be forwarded and used, as indicated with step 807, while if it is determined in step 813 that one or more packets are dropped, a process for identifying the packet is initiated, as indicated with step 814, followed by a process for requesting the dropped packet(s) from the server, as indicated in step 815. Step 815 corresponds to the process described above with reference to FIG. 5b, i.e. the received packet is compared to package identification data until a match occurs and the identified packet can be inserted into the buffer.

The process described above is repeated until termination of reception of the transport stream.

Figure 9A:
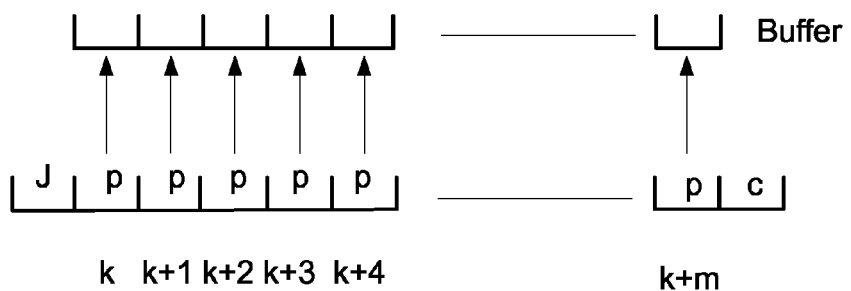
FIGS. 9a and 9b illustrates in yet another series of events a scenario according to the method of FIG. 8.
Figure 9B:

FIGS. 9a and 9b illustrates an example of executing an FCC according to the embodiment described above. Subsequent to receiving a join channel request, J, entered by a user, at a client of a STB, packets k to k+m, received from a server, are put in a buffer, one at time, according to step 804 of FIG. 8, until a control packet, C is received, resulting in the execution of steps 808 to 810, and possibly 811, of FIG. 8. In case it is determined in step 810 of FIG. 8 that the start packets are to be requested from the server, all packets received between the most previous RAP and packet k are requested from the server, as illustrated in FIG. 9b.

In addition to using the suggested control packets according to any of the embodiments described above, data of a control packet may be used by a client also for estimating a quality of the channel used for transmitting an MPEG transport stream between a server and the client. When an operator wants to analyze its communications network a normal procedure comprises a check for dropped packets. This is typically done by checking the IP stack, or a continuity counter which is typically contained in the MPEG transport headers. Using drop statistics based on the IP stack is however not reliable, since it may contain statistics for other services. In addition, packets might also be dropped inside or after the IP stack.

To use a continuity counter for the described purpose may also turn out to be a very unreliable method, since a continuity counter typically is configured as a 4 bit counter, meaning that in case more than 16 packets are dropped, the counter will not be able to register how many packets that have actually been dropped.

Figure 10:
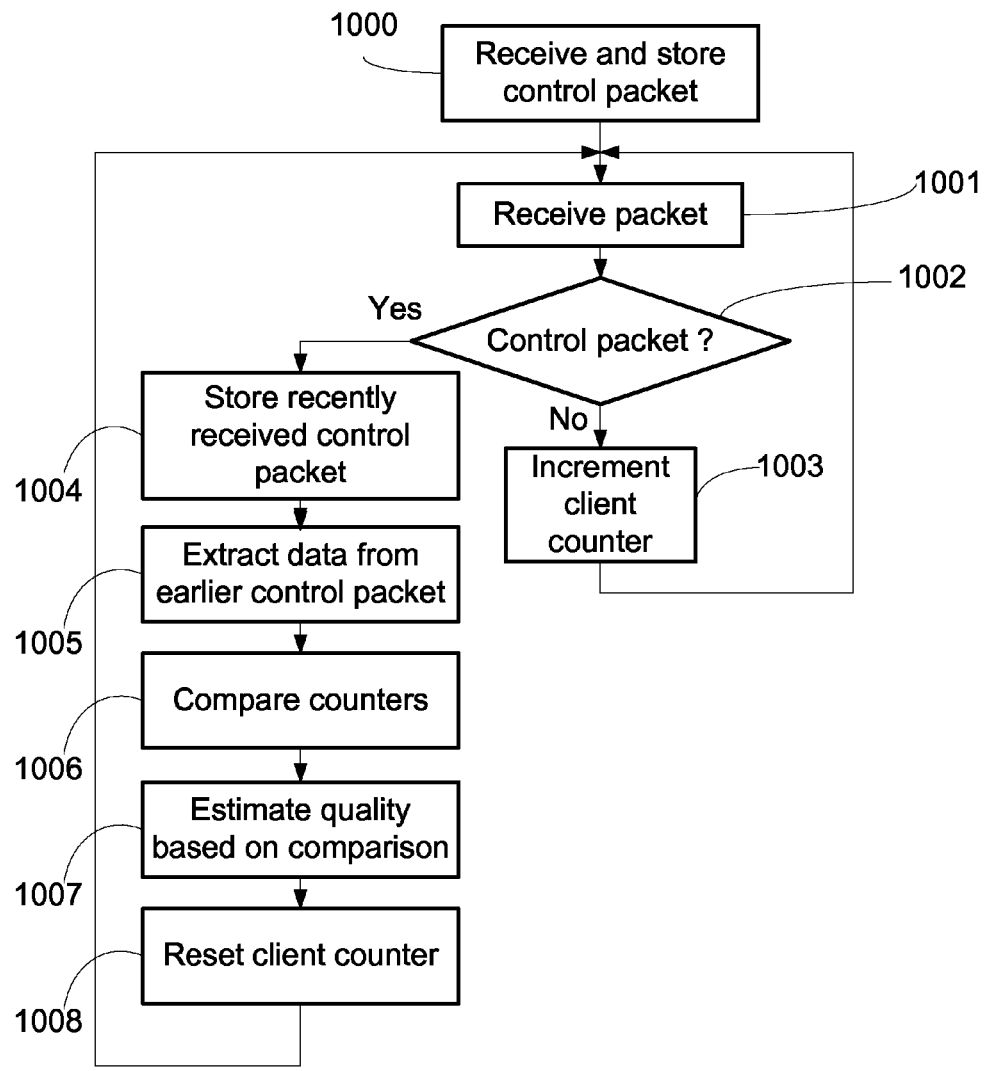
FIG. 10 is a flow chart illustrating how data acquired from control packets can be used for providing a quality estimate of a connection used for transmission of a transport stream between a server and a client.

FIG. 10 therefore illustrates, in a flow chart, a method which can be used in parallel to any of the two methods described above for the purpose of using content of the control packets also for estimating the quality of the channel used for transmission of the MPEG transport stream. More specifically, the method of FIG. 10 refers to a method for achieving a more reliable quality estimation of the MPEG transport stream. In the present embodiment, two consecutive control packets are required by the client, where data of a first control packet containing information on n subsequent packets is used once a second control packet, having the function of a trigger, indicating that all n packets have been sent by the server, has been received and identified by the client.

In a first step 1000 of FIG. 10 the client receives and stores a first control packet, and in a subsequent step 1001 another packet is received. If, as in the present case, it is determined in another step 1002 that the received packet is not another control packet, a counter, from hereinafter referred to as a client counter, starting from 0 when a first packet other than a control packet is received subsequent to receiving a control packet, is incremented, as indicated in step 1003. The process of steps 1000-1003 are repeated for subsequently received packets until it is determined in step 1002 that a second control packet has been received.

When it is determined in step 1002 that another control packet has been received in the MPEG transport stream, a quality evaluation process, as described in steps 1004-1008, is triggered, which results in storing of the data of the second control packet, i.e. the most recently received control packet, as indicated in step 1004, and extracting of data contained in the earlier control packet, i.e. the first control packet previously stored by the client, as indicated in another step 1005. In a next step 1006 the present setting of the client counter is compared to another counter comprised in the control packet which comprises a value indicating the number of packets inserted to the MPEG transport stream at the server between the two consecutive control packets.

On the basis of the comparison made by the client, a quality evaluation can now be executed, as indicated in a subsequent step 1007. In a next step 1008, the client counter is reset, in order to prepare the client for another quality evaluation for another series of packets.

Figure 11:
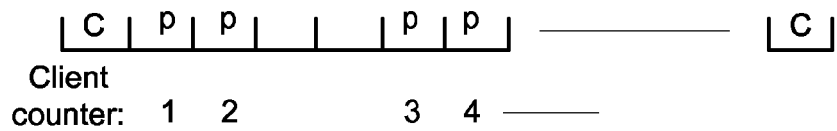
FIG. 11 is illustrating a scenario on how control packet content may be used for quality estimation by using the method of FIG. 10.

FIG. 11 is a simplified illustration of a scenario for estimating the quality of a channel when using the method described above, with reference to FIG. 10. As indicated in FIG. 11, the reception of a control packet is triggering a client counter to start counting each packet received by the client from a server and continues to count packets until a new control packet is received. In the present example two packets are missing. Thereby, since each control packet comprises data on n subsequent packets, the client counter will in the present case be set to n−2. When the counter provided in the control packet is compared to the client counter, such a comparison will indicate that two packets were missing during transmission.

Figure 12:
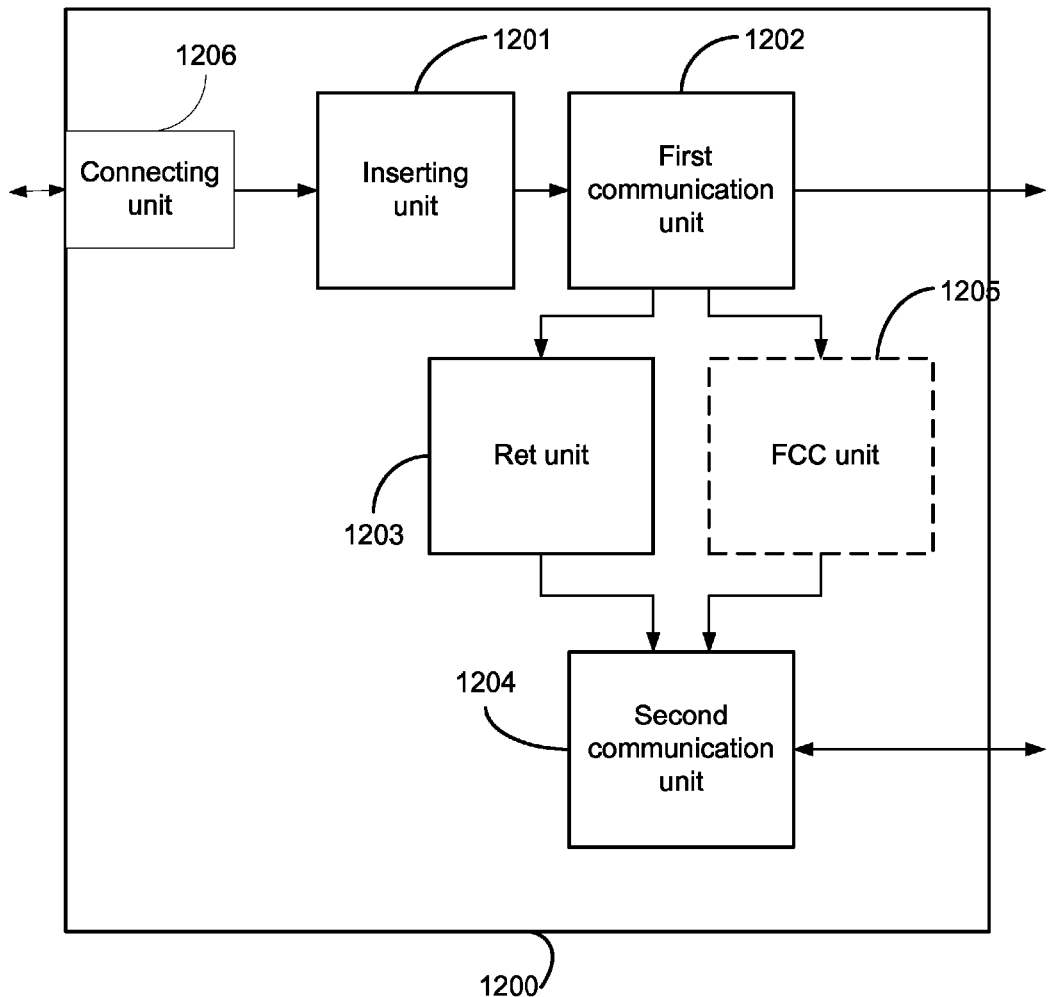
FIG. 12 is a simplified block scheme illustrating a server configured to provide a transport stream with control packets.

In order to be able to contain control packets into MPEG transport streams as suggested above, the server used for distribution of the transport stream has to be adapted accordingly. FIG. 12 is a simplified block scheme of a server 1300 which is configured to execute any of the methods described above.

It is to be understood that a server configured to execute the suggested control packet inserting method also comprise additional functional units for enabling processing of content which is accessible by clients. However, for simplicity reason, the server of FIG. 12 only comprises functional entities which are relevant for the understanding of the operation of the described method. In a corresponding way, a client described in further detail below, is described only by way of interacting functional units which are necessary for the understanding of how the proposed control packets and associated packets can be utilized by the client.

The server 1200 comprise an inserting unit 1201 configured to receive packets associated with a requested MPEG transport stream from a content source (not shown) connected to or integrated with the server, and to embed control packets into the MPEG transport stream at regular intervals as already described above. In addition, the inserting unit 1201 is configured to insert additional data associated with the MPEG transport stream, such as e.g. one or more of the data items described above with reference to FIGS. 2 and 4, giving information on up to n packets of an MPEG transport stream. The server 1200 also comprises a first communication unit 1202 configured to transmit the MPEG transport stream to one or more user devices.

In order to enable for clients of connected user devices to apply re-transmission, a unit configured to manage re-transmission of packets, here referred to as a RET unit 1203 is connected to the first communication unit 1202, such that transmitted packets can be provided to the RET unit 1203 during transmission, for later retrieval by a client requesting re-transmission of significant packets. Since the RET unit is configured as a functional unit which enables re-transmissions to a requesting client in a conventional manner, the RET unit will not be described in any further detail in this document.

The RET unit 1203 is also connected to a second communication unit 1204 which is configured to provide a two way communication between the server and the client, thereby enabling re-transmission of packets via UDP, TCP, RTP or any other suitable protocol adapted for enabling packet distribution. Alternatively, the server 1200 may be provided with one single communication unit which is configured to execute all communication with the client.

If the server 1200 is configured for applying FCC the server also comprises an FCC unit 1205, which is operatively connected to the first and the second communication units 1202, 1204. The FCC unit 1205 is to be referred to as a functional unit which is configured to, on request from a client, provide start packets to a client, typically via the second communication unit 1204 upon request.

Also a client configured to support a user device, such as e.g. a STB enabling the FCC feature described above, or a TV enabling the suggested re-transmission feature will have to be modified accordingly if it is to be able to recognize and process the control packets accordingly. As already mentioned, however, due to the structure of the suggested control packets, no modifications of clients which are not required to process such control packets will be necessary.

Figure 13:
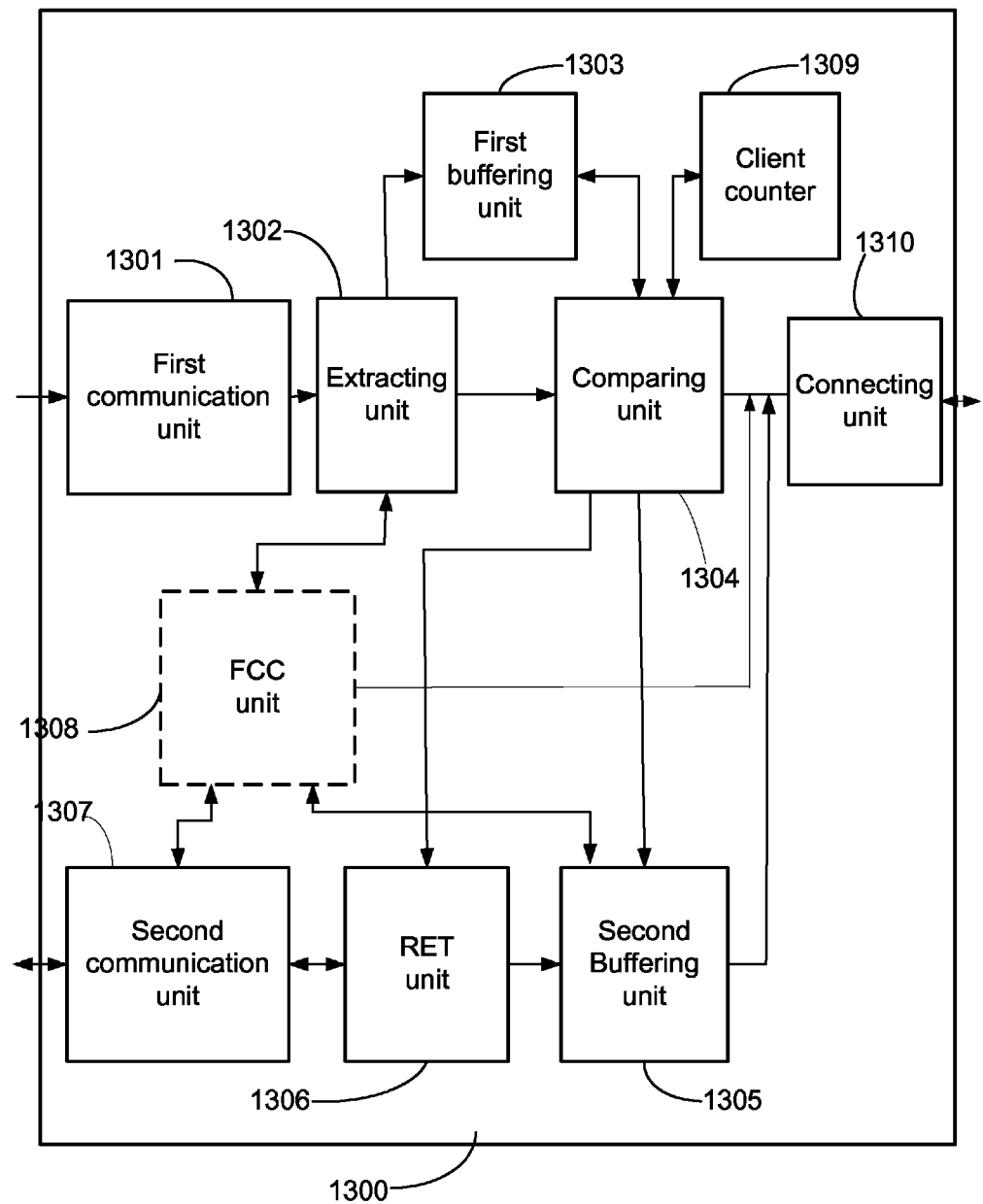
FIG. 13 is another simplified block scheme illustrating a client configured to extract and handle control packets received from a server.

FIG. 13 is a simplified block scheme of a client 1300 which is to be implemented in a conventional user device (not shown), and which is configured to interact with a server (not shown), such as e.g. the one described above with reference to FIG. 12, which is configured to provide MPEG transport streams to the client on request. The client 1300 of FIG. 13 comprises a first communication unit 1301 configures to receive MPEG transport streams from a server, such as the one described above with reference to FIG. 12. The first communication unit 1301 is operatively connected to a functional unit, here referred to as an extracting unit 1302, configured to identify control packets in an MPEG transport stream received from the server via the first communication unit 1301, and to extract data from an identified control packet. The extracting unit 1302 is connected to another functional unit, here referred to as a first buffering unit 1303, configured to store the extracted control packet data, such that is can later be retrieved by yet another functional unit, here denoted a comparing unit 1304, which is operatively connected also to the extracting unit 1302 and configured to compare received packets other than control packets to control packet data for identification purposes as already described above. The comparing unit 1304 is also operatively connected to another functional unit, here referred to as second buffering unit 1305, wherein the comparing unit 1304 is configured to temporary buffer received and identified packets before they can be used by processing functionality (not shown) normally connected to the client, typically via the comparing unit 1304.

In addition, the comparing unit 1304 is operatively connected to a re-transmission (RET) unit 1306, and configured to instruct the RET unit 1306 to request re-transmissions from the server whenever required, due to a comparison which does not result in a match. For the purpose of requesting re-transmissions, re RET unit 1306 is also operatively connected to a second communication unit 1307, which is configured to interact with the server via an appropriate protocol. It is to be understood that alternatively, one single communication unit may be configured to manage all communication with the server. Alternatively, the buffering functionality may alternatively be arranged in one single buffering unit, having separate buffering areas dedicated for different purposes.

If the client 1300 is configured for applying FCC, it typically also comprises a FCC unit 1308 which is configured to provide FCC functionality, enabling requesting and insertion of start packets. As indicated in FIG. 13, the FCC unit 1308 is operatively connected to a communication unit, in the present example denoted a second communication unit 1307, via which it can request and receive start packets from the server, and to the second buffering unit 1305, such that buffered packets can be obtained, and provided to the output of the client together with the acquired start packets, and any processing logic which may be connected to the output of the client.

Whether or not to request for start packets, as indicated above, is a decision for the client to take depending on the relevant structure of the requested transport stream. As already indicated above, such a decision can be taken based on information on RAPs of the transport stream acquired from the control packets. Consequently, the FCC unit 1308 is also configured to evaluate whether start packets should be requested, or whether, depending on when the RAP is expected in the transport stream the client should instead continue to receive and store packets one by one.

If the client is adapted to also estimate the quality of the connection used between the client and the server for delivery of the MPEG transport stream, the client 1300 also comprises a counter, here referred to as a client counter 1309, configured to count the number of packets received by the client 1300, wherein the client counter is incremented for each received packet. If this feature is applied, the comparing unit 1304 is also configured to compare the client counter 1309 to a counter comprised in a respective control packet, in order to determine the number of missing packets, if any, based on this measure, to determine a quality measure of the communication between the client and the server.

Figure 14:
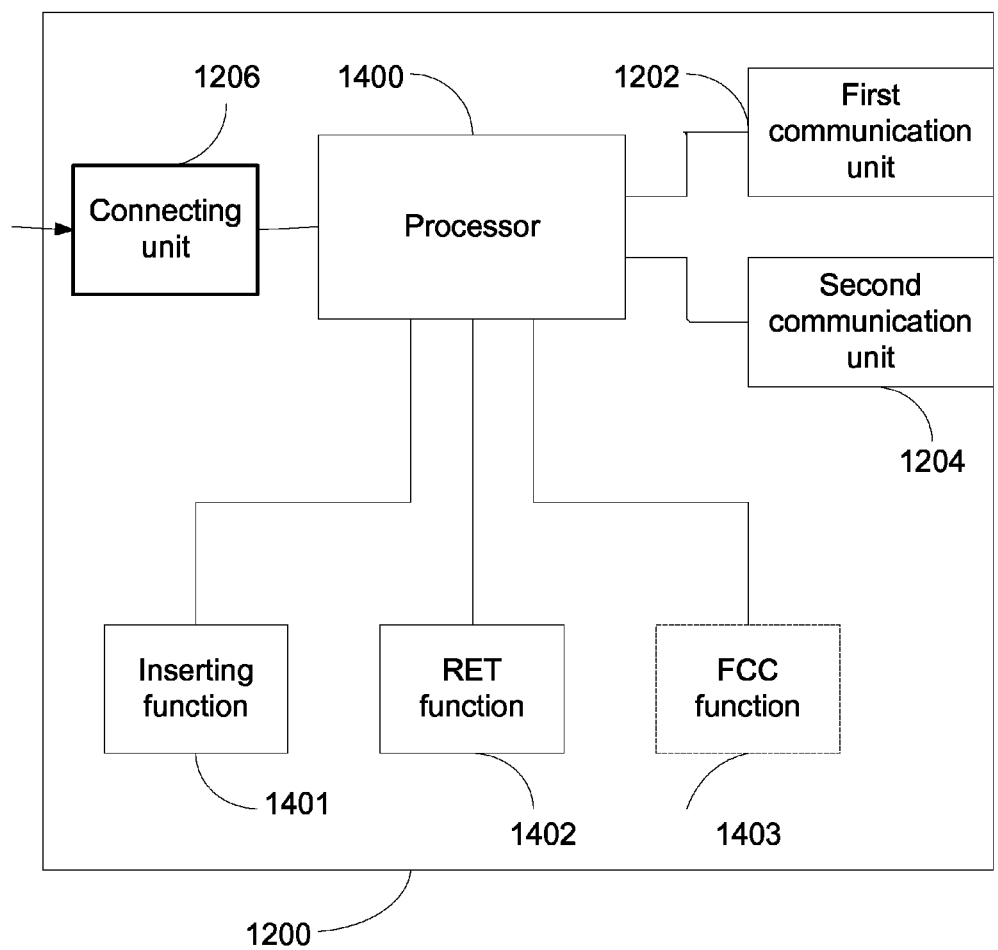
FIG. 14 is a simplified illustration of how the server of FIG. 12 may be realized at least partly as a software related implementation.

Both the functionality of the server which has been described above and the client as described above may be realized completely as a software based implementation, i.e. as a computer program, as a hardware based implementation, such as e.g. having the described functions implemented on one or more ASICs (Application Specific Integrated Circuits), or as a combination of hardware and software implementation. A software based implementation of the server functionality described above according to one embodiment is illustrated in the simplified scheme of FIG. 14, where a processor 1400 is connected to a connecting unit 1206 via which an MPEG transport stream can be received from a suitable source. The processor 1400 is also connected to a first and a second communication unit, 1202, 1204, which alternatively may be implemented as one communication unit. In addition, the server 1200 is provided with a plurality of functions which are controllable by the processor 1400, where an inserting function 1401 is configured to execute functionality of the inserting unit 1201 of FIG. 12, while a RET function 1402 is configured to execute functionality of the RET unit 1203 of FIG. 1200. If the server is also supporting FCC is will also comprise a FCC function 1403. When based on the functions described above, a computer program will comprise computer readable means which when run together with the connecting unit 1206 and the communication units 1202, 1204 will cause the server to execute one or more of the server related methods described above.

Figure 15:
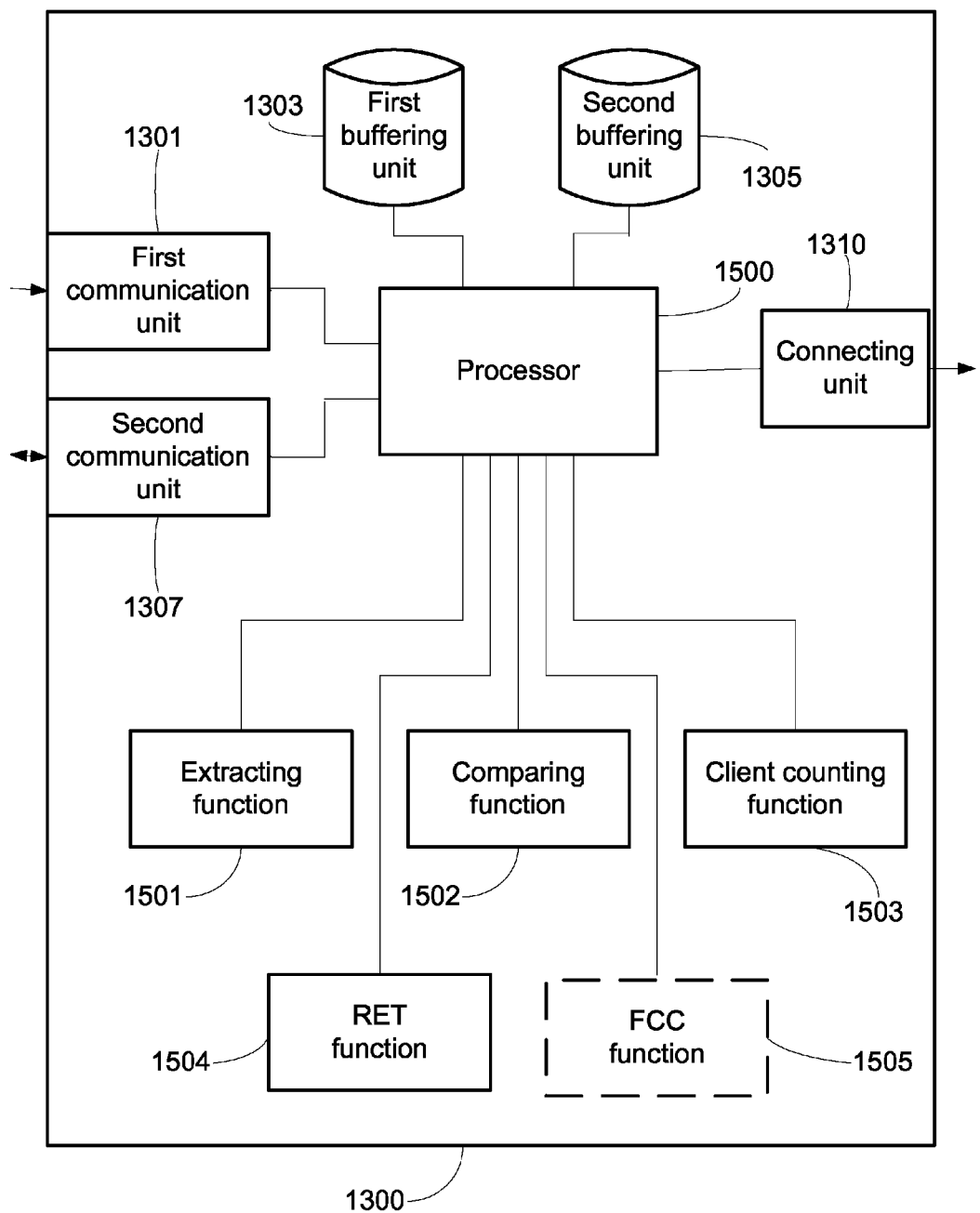
FIG. 15 is a simplified illustration of how the client of FIG. 13 may be realized at least partly as a software related implementation.

In a corresponding way FIG. 15 is an illustration of a client 1300 which at least partly is implemented as a computer program which when run on a device causes the device to execute one or more of the client related methods described above. The client 1300 of FIG. 15 comprises a processor 1500 which is connected to a first and second communication unit 1301, 1307, which alternatively may be configured as one communication unit, a first and a second buffering unit 1303, 1305 for buffering received packets and content acquired from received packets and a connecting unit 1310 for connecting the client functionality to any type of processing functionality residing on the device which require MPEG transport stream content. As indicated in FIG. 15, a software implemented client 1300 also comprises a plurality of dedicated functions, here referred to as an extracting function 1501, a comparing function 1502, a client counting function 1503, and a RET function 1504. If the client 1300 is a client, which is configured to support FCC, the client 1300 also comprises a FCC function 1505 in a way which corresponds to the operation of the server described above, the described client functions are configured to realize functionality which corresponds to the respective functional units described above with reference to FIG. 13, i.e. the functionality of the extracting unit 1302, the comparing unit 1304, the client counter 1309, the RET unit 1306, and optionally also the FCC unit 1308, respectively.

It is to be understood, that the described server, as well as the client serves the purpose of exemplifying how functional entities and/or different functions may interact with each other in order to enable for one or more of the embodiments described above to be executed on a respective entity. However, one or more of the described functional units and functions may alternatively be arranged on the physical node or device on which the respective server or client is installed, as long as these one or more functional units and/or functions are accessible by the client or server. In addition, configurations where one or more of the described functional units and/or functions are combined may also alternatively be applied as long as the general functionality as described above can be achieved.

To sum up, use of the control packets described in this document will improve the mechanism for acquiring packets from a server, without resulting in any client incapability, or media content artifact to a client which is not capable of recognizing and processing the control packets. The suggested control packets require a low overhead and implementation at the client is easy. The control packets are applicable for practically all types of media and may also enable a client to obtain statistics on the quality a received transport stream which in many situations is more accurate that what can be obtained by using alternative prior art solutions.

The invention claimed is:

1. A method performed by a server of a communication network for handling an MPEG transport stream, said method comprising:
   transmitting, to a client, a first packet of the MPEG transport stream, the first packet being a control packet, wherein the control packet comprises package identification data that enables the client to identify each of subsequent n packets in the MPEG transport stream;
   transmitting, to the client, a second packet of the MPEG transport stream, wherein the second packet is not a control packet; and
   receiving, from the client, a re-transmission request of one or more packets determined as missing when the second packet received by the client is not an expected packet based on comparing the second packet to the package identification data extracted from the first packet available at the client.

2. The method according to claim 1, further comprising generating the package identification data for the control packet by:
   for each of the n packets of the MPEG transport stream subsequent to the control packet, generating associated package identification data comprising an array index representative of a relative order of the packet in the MPEG transport stream and an associated identity which is representative of at least a part of content of the packet;
   sequentially arranging each array index and its associated identity in a control data list and
   inserting the control data list into the control packet.

3. The method according to claim 1, wherein the MPEG transport stream comprises mts packets and wherein the n packets of the MPEG transport stream subsequent to the control packet are selectively chosen from the MPEG transport stream by selecting each k:th mts packet from said MPEG transport stream, where k<n.

4. The method according to claim 1, wherein the MPEG transport stream comprises UDP packets and wherein the n packets of the MPEG transport stream subsequent to the control packet are selectively chosen from the MPEG transport stream by selecting each k:th UDP packet from said MPEG transport stream, where k<n.

5. The method according to claim 1, wherein the package identification data for the control packet is inserted into the payload of the control packet.

6. The method according to claim 1, further comprising inserting further control information into the control packet, wherein the further control information comprises at least one of:
   a version of the package format applied by the MPEG transport stream;
   a package type applied by the MPEG transport stream;
   a server address;
   a time stamp indicating a time instance of transmitting the control packet;
   a control data length indicating length of the payload of the control packet;
   a counter for counting number of missing packets of the MPEG transport stream subsequent to the control packet;
   an indication of a number of packets contained in the MPEG transport stream since the most previous RAP; and
   an indication of a remaining number of packets until the occurrence of the next RAP in the MPEG transport stream.

7. The method according to claim 6, wherein the further control information is inserted into a header of the control packet.

8. A method at a client for handling an MPEG transport stream received from a server of a communication network, said method comprising:
   receiving, from the server, a first packet of the MPEG transport stream, the first packet being a control packet, wherein the control packet comprises package identification data that enables the client to identify each of subsequent n packets in the MPEG transport stream;
   storing the first packet in a memory;
   receiving, from the server, a second packet of the MPEG transport stream, wherein the second packet is not a control packet;
   determining whether the received second packet is an expected packet of the subsequent n packets based on comparing the second packet to the package identification data extracted from the first packet available at the client; and
   requesting re-transmission of one or more packets determined as missing when the received second packet is not the expected packet.

9. The method according to claim 8, wherein the MPEG transport stream comprises mts packets and wherein the n packets of the MPEG transport stream subsequent to a given control packet are obtained from the MPEG transport stream by selecting each k:th mts packet from said MPEG transport stream, where k<n.

10. The method according to claim 8, wherein the MPEG transport stream comprises UDP packets and wherein the n packets of the MPEG transport stream subsequent to a given control packet are obtained from the MPEG transport stream by selecting each k:th UDP packet from said MPEG transport stream, where k<n.

11. The method according to claim 8, comprising the further steps of:
   receiving a join channel request, requesting a new MPEG transport stream; and
   receiving packets of the new MPEG transport stream, and handling each packet received therein according to any of the following steps:
      storing control packet data of the received packet in case the received packet is a control packet, and requesting start packets of the new MPEG transport stream from the server, for a selected channel identifiable on the basis of additional data extracted from the stored control packet data, acquiring any buffered content associated with the new MPEG transport stream, and providing the requested and buffered content to a processing unit connected to the client, in case a fast channel change mode is active at the client and in case the number of packets between the present packet and the next RAP is below a predefined threshold; or
      buffering the received packet into a buffer, in case the received packet is not a control packet and no stored control packet data is available; or
      comparing the received packet to stored control packet data, in case the received packet is not a control packet and stored control packet data is available at the client.

12. The method according to claim 11, wherein said additional data comprise one or both of: an indication of the number of packets contained in the new MPEG transport stream since the most recent RAP, and an indication of the remaining number of packets until the occurrence of the next RAP in the new MPEG transport stream.

13. The method according to claim 8, wherein the control packet comprises information indicative of the repeating rate applied by the server for transmitting the control packet in the MPEG transport stream.

14. The method according to claim 8, wherein the control packet comprises further transport stream information, indicative of at least one of:
   a version of the package format applied by the MPEG transport stream;
   a package type applied by the MPEG transport stream;
   a server address;
   a time stamp indicating a time instance of transmitting the control packet; and a control data length indicating a length of the payload of the control packet.

15. The method according to claim 8, wherein the method further comprises:
counting packets in the MPEG transport stream between consecutive control packets;
comparing the count to a counter contained in the control packet, which indicates the number n of packets of the MPEG transport stream subsequent to the control packet; and
estimating on the basis of said comparison a quality measure for a connection used for transmitting the MPEG transport stream to the client.

16. The method according claim 8, comprising the steps of:
storing control packet data from the control packet received in the MPEG transport stream; and
extracting from the control packet data of the control packet, package identification data comprising, for each one of the n packets of the MPEG transport stream subsequent to the control packet, an array index representative of relative order of the packet in the MPEG transport stream and an associated identity which is representative of at least a part of the content of the packet.

17. A method according to claim 8, further comprising the following steps to be executed in case a received packet is not a control packet and package identification data is available at the client:
receiving a packet of the MPEG transport stream other than a control packet; and
identifying the received packet by repeatedly comparing content of the received packet to identities extracted from the package identification data until a comparison results in a match between a compared packet content and identity.

18. The method according to claim 17, further comprising:
inserting identified packets into a buffer; and
requesting re-transmission of one or more packets determined as missing based on said comparisons not resulting in a match with any of the identities; or
using identified packets at the client and each previously identified and buffered packet of the MPEG transport stream, in case a first comparison resulted in a match.

19. The method according to claim 18, wherein during said comparisons a received packet is compared to an identity pointed at by a list pointer, and wherein the method includes controlling said list pointer so that after a first comparison resulting in a match, the list pointer is pointing at an identity corresponding to the first one of unidentified packets received in the MPEG transport stream.

20. A server connectable to a communication network and configured for handling an MPEG transport stream, said server comprising:
a first communication unit configured to:
transmit a first packet of the MPEG transport stream to a client of the communication network, the first packet being a control packet, wherein the control packet comprises package identification data that enables the client to identify each of subsequent n packets in the MPEG transport stream; and
transmit a second packet of the MPEG transport stream to the client, wherein the second packet is not a control packet; and
a re-transmission unit configured to receive, from the client, a re-transmission request of one or more packets determined as missing when the second packet is not an expected packet based on a comparison of the second packet to the package identification data extracted from the first packet available at the client.

21. The server according to claim 20, wherein an inserting unit is configured to generate the package identification data for the control packet by:
for each one of the n packets of the MPEG transport stream subsequent to the control packet, an array index representative of a relative order of the packet in the MPEG transport stream and an associated identity which is representative of at least a part of the content of the packet;
arranging each array index and associated identity as a separate post in a control data list; and
inserting the control data list into the control packet.

22. The server according to claim 20, wherein the inserting unit is further configured to insert into the control packet further information on the structure of the transport stream, wherein said further information is indicative of at least one of:
a version of the package format applied by the transport stream;
a package type applied by the transport stream;
a server address;
a time stamp indicating a time instance of transmitting the control packet;
a control data length indicating length of the payload of the control packet;
a counter indicating number of packets of the transport stream subsequent to the control packet or since a last control packet;
an indication of a number of packets contained in the transport stream since the most recent RAP; and
an indication of remaining number of packets until the occurrence of the next RAP in the transport stream.

23. A client connectable to a communication network and configured for handling an MPEG transport stream provided from a server of the communication network, said client comprising:
a first communication unit configured to:
receive, from the server, a first packet of the MPEG transport stream, the first packet being a control packet, wherein the control packet comprises package identification data that enables the client to identify each of subsequent n packets in the MPEG transport stream;
store the first packet in a memory;
receive, from the server, a second packet of the MPEG transport stream, wherein the second packet is not a control packet; and
a re-transmission unit configured to request, from the server, for re-transmission of one or more packets determined as missing when the received second packet is not an expected packet based on a comparison of the second packet to the package identification data extracted from the first packet available at the client.

24. The client according to claim 23, further comprising a comparing unit configured to identify individual ones of the n packets inserted subsequent to a given control packet, based on sequentially comparing content of each such packet to the package identification data until a comparison results in a match between content of the packet and an identity contained in said package identification data.

25. The client according to claim 24, wherein the comparing unit is configured to compare a given received packet, other than a control packet, to an identity pointed at by a list pointer, and to control said list pointer, such that if the comparison results in a direct match, the list pointer is pointing at an identity corresponding to a first one of received unidentified packets of the MPEG transport stream.

26. The client according to claim 23, wherein the package identification data in the control packet comprises, for each of the n packets of the MPEG transport stream subsequent to the control packet, a post comprising a respective array index representative of the relative order of the packet in the MPEG transport stream and an associated identity which is representative of content of the packet, and wherein the client is configured to receive a packet of the transport stream other than a control packet, and to identify the received packet by sequentially comparing content of the received packet to the identities contained in the packet identification data, until recognizing a match in the comparison.

27. The client according to claim 23, wherein the client is included within a User Equipment (UE).

28. The client according to claim 27, wherein the UE comprises one of: a set top box, a cellular telephone, a laptop, and a television set.

29. The client according to claim 23, further comprising a Fast Channel Change (FCC) unit configured to, in response to recognizing a fast channel change request, request a new MPEG transport stream, instruct a second communication unit to request start packets associated with the new MPEG transport stream from the server, to acquire identified, buffered packets associated with the new MPEG transport stream from the second buffering unit, and to provide the requested start packets, once received by the second communication unit, together with any buffered packets to a processing function connected to an output of the client.

30. The client according to claim 29, wherein the FCC unit is configured to determine whether or not to request said start packets from the server on the basis of data acquired from control packets received by the client.

31. The client of claim 29, wherein the client is included in a set top box that is configured for receiving and processing MPEG transport streams representative of respective Internet Protocol TV (IPTV) channels.

32. The client according to claim 24, further comprising a client counter configured such that it is incremented for each packet other than control packets received by the client between two consecutive control packets, wherein, in association with recognizing the second of said consecutive control packets, the comparing unit is configured to compare said client counter to a counter contained in the first of said consecutive control packets, and to estimate on the basis of said comparison a quality measure for the connection used for transmitting the MPEG transport stream between the server and the client.

* * * * *